(12) United States Patent
Liou

(10) Patent No.: US 11,368,950 B2
(45) Date of Patent: Jun. 21, 2022

(54) METHOD AND APPARATUS FOR BEAM MANAGEMENT IN UNLICENSED SPECTRUM IN A WIRELESS COMMUNICATION SYSTEM

(71) Applicant: ASUSTek Computer Inc., Taipei (TW)

(72) Inventor: Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 15 days.

(21) Appl. No.: 16/010,266

(22) Filed: Jun. 15, 2018

(65) Prior Publication Data

US 2018/0368142 A1 Dec. 20, 2018

Related U.S. Application Data

(60) Provisional application No. 62/520,956, filed on Jun. 16, 2017.

(51) Int. Cl.
*H04W 74/08* (2009.01)
*H04W 72/04* (2009.01)
*H04W 16/28* (2009.01)
*H04W 16/14* (2009.01)

(52) U.S. Cl.
CPC ....... *H04W 72/0446* (2013.01); *H04W 16/14* (2013.01); *H04W 16/28* (2013.01); *H04W 74/0808* (2013.01)

(58) Field of Classification Search
CPC . H04W 24/10; H04W 16/14; H04W 74/0808; H04W 16/28; H04B 7/0617; H04B 1/7143
See application file for complete search history.

(56) References Cited

U.S. PATENT DOCUMENTS

| | | | |
|---|---|---|---|
| 9,237,582 B2 | 1/2016 | Seol | |
| 2010/0246434 A1* | 9/2010 | Wang | H04W 72/044 370/253 |
| 2015/0358129 A1* | 12/2015 | Ryu | H04L 5/0023 455/438 |
| 2017/0231011 A1* | 8/2017 | Park | H04W 74/006 |
| 2017/0238233 A1* | 8/2017 | Oh | H04W 40/04 370/328 |
| 2017/0366992 A1* | 12/2017 | Rune | H04B 7/043 |
| 2018/0109303 A1* | 4/2018 | Yoo | H04B 7/088 |
| 2018/0309479 A1* | 10/2018 | Yerramalli | H04L 5/0012 |
| 2020/0077437 A1* | 3/2020 | Stern-Berkowitz | H04B 7/0413 |

* cited by examiner

*Primary Examiner* — Mansour Oveissi
(74) *Attorney, Agent, or Firm* — Cooper Legal Group LLC

(57) ABSTRACT

A method and apparatus are disclosed from the perspective of a User Equipment. In one embodiment, the method includes the UE detecting and/or receiving downlink transmission in a first channel occupancy time in unlicensed spectrum. The method also includes the UE detecting and/or receiving downlink transmission in a second channel occupancy time in unlicensed spectrum, wherein the second channel occupancy time is a next channel occupancy time detected by the UE after the first channel occupancy time. The method further includes that after the first channel occupancy time ends, the UE performs receiving beam sweeping in each time unit until the UE receives downlink transmission in the second channel occupancy time or until the UE finds a candidate beam in the second channel occupancy time.

24 Claims, 16 Drawing Sheets

| Channel Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 2 | 3 | 7 | 2 ms | {3,7} |
| 2 | 2 | 7 | 15 | 3 ms | {7,15} |
| 3 | 3 | 15 | 1023 | 6ms or 10 ms | {15,31,63,127,255,511, 1023} |
| 4 | 7 | 15 | 1023 | 6ms or 10 ms | {15,31,63,127,255,511, 1023} |

NOTE1: For $p = 3,4$, $T_{ulmcot,p} = 10$ms if the higher layer parameter '*absenceOfAnyOtherTechnology-r14*' indicates TRUE, otherwise, $T_{ulmcot,p} = 6$ms.

NOTE 2: When $T_{ulmcot,p} = 6$ms it may be increased to 8 ms by inserting one or more gaps. The minimum duration of a gap shall be 100 μs. The maximum duration before including any such gap shall be 6 ms..

FIG. 5 (PRIOR ART)

METHOD AND APPARATUS FOR BEAM MANAGEMENT IN UNLICENSED SPECTRUM IN A WIRELESS COMMUNICATION SYSTEM

CROSS-REFERENCE TO RELATED APPLICATIONS

The present Application claims the benefit of U.S. Provisional Patent Application Ser. No. 62/520,956 filed on Jun. 16, 2017, the entire disclosure of which is incorporated herein in their entirety by reference.

FIELD

This disclosure generally relates to wireless communication networks, and more particularly, to a method and apparatus for beam management in unlicensed spectrum in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes the UE detecting and/or receiving downlink transmission in a first channel occupancy time in unlicensed spectrum. The method also includes the UE detecting and/or receiving downlink transmission in a second channel occupancy time in unlicensed spectrum, wherein the second channel occupancy time is a next channel occupancy time detected by the UE after the first channel occupancy time. The method further includes that after the first channel occupancy time ends, the UE performs receiving beam sweeping in each time unit until the UE receives downlink transmission in the second channel occupancy time or until the UE finds a candidate beam in the second channel occupancy time.

BRIEF DESCRIPTION OF THE DRAWINGS

FIG. 5 is a reproduction of Table 15.2.1-1 of 3GPP TS 36.213 V14.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V14.2.0, "E-UTRA Physical layer procedures"; TS 36.212 V14.2.0, "E-UTRA Multiplexing and channel coding"; Final Report of 3GPP TSG RAN WG1 #86bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 #88 v1.0.0 (Athens, Greece, 13-17 Feb. 2017); Final Report of 3GPP TSG RAN WG1 #88bis v1.0.0 (Spokane, USA, 3-7 Apr. 2017); Draft Report of 3GPP TSG RAN WG1 #89 v0.1.0 (Hangzhou, China, 15-19 May 2017); Final Report of 3GPP TSG RAN WG1 #AH1_NR v1.0.0 (Spokane, USA, 16-20 Jan. 2017); and Final Report of 3GPP TSG RAN WG1 #86 v1.0.0 (Gothenburg, Sweden, 22-26 Aug. 2016). The standards and documents listed above are hereby expressly incorporated by reference in their entirety.

Figure 1:
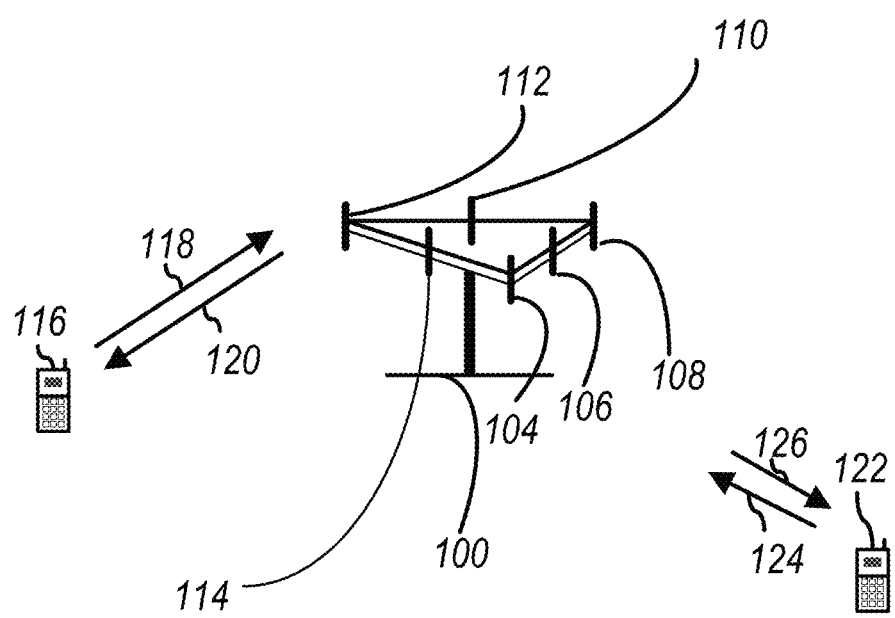
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
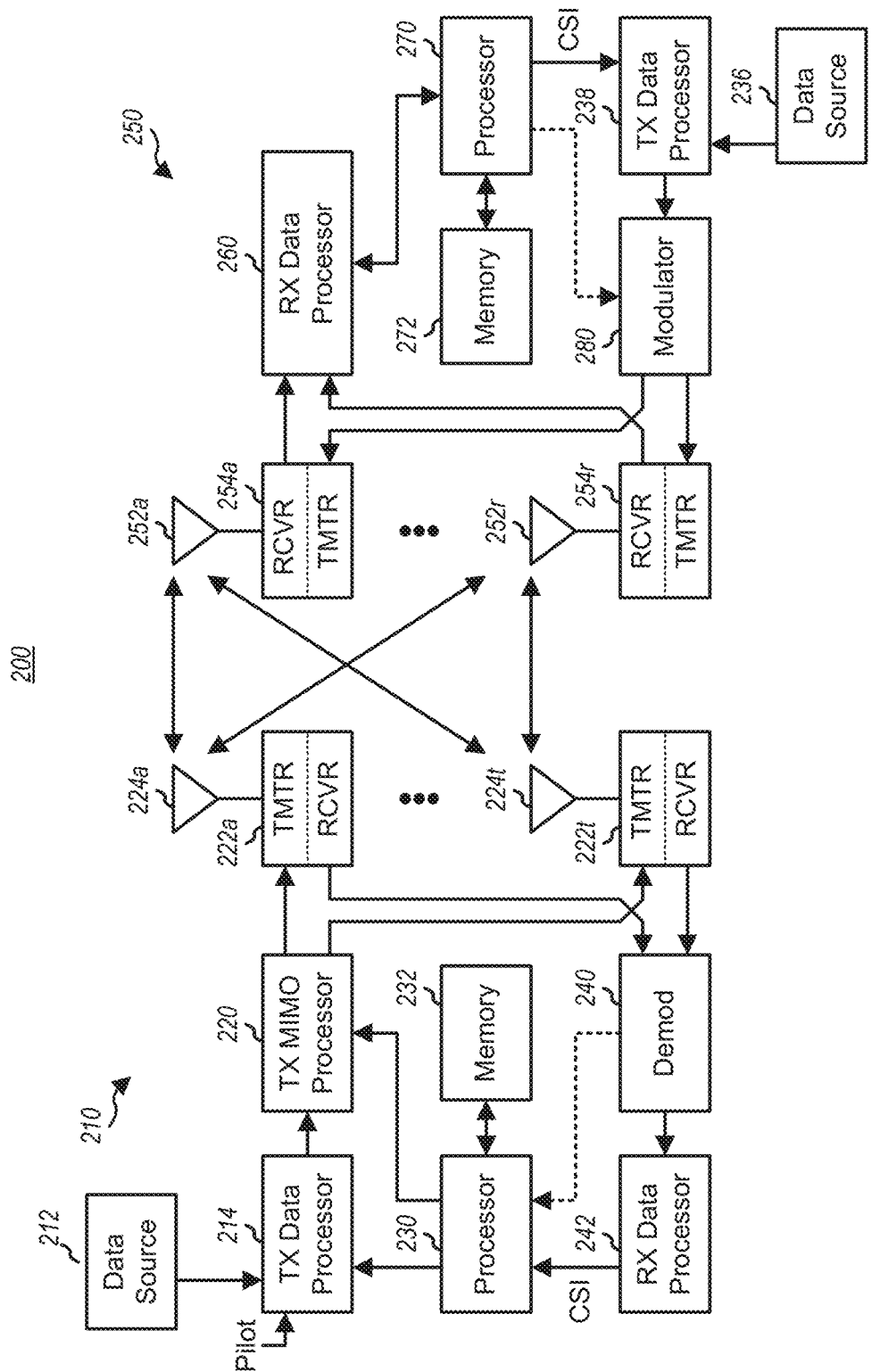
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
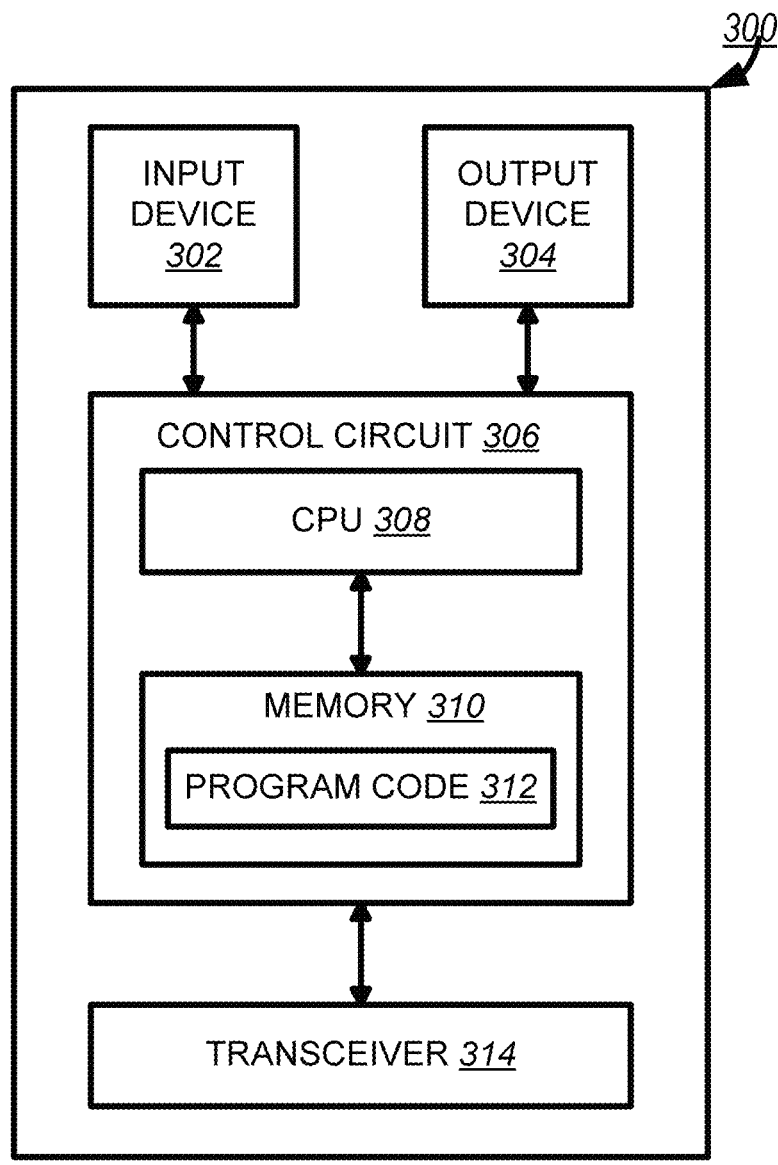
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
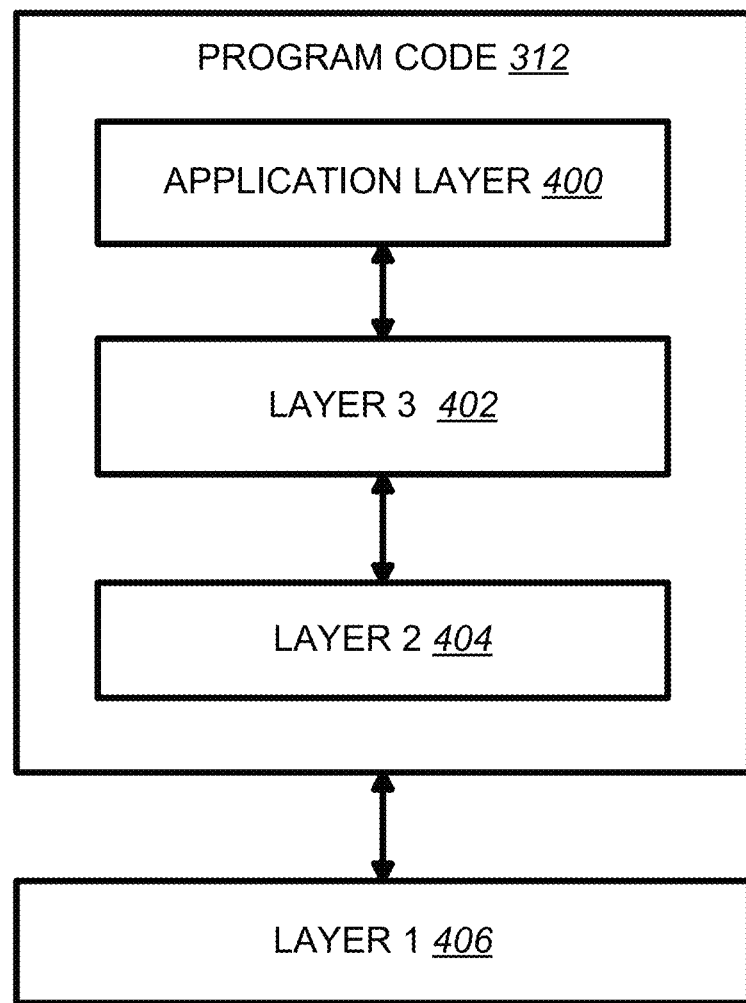
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 states:

15.2 Uplink Channel Access Procedures

A UE and a eNB scheduling UL transmission(s) for the UE shall perform the procedures described in this sub clause for the UE to access the channel(s) on which the LAA Scell(s) transmission(s) are performed.

15.2.1 Channel Access Procedure for Uplink Transmission(s)

The UE can access a carrier on which LAA Scell(s) UL transmission(s) are performed according to one of Type 1 or Type 2 UL channel access procedures. Type 1 channel access procedure is described in sub clause 15.2.1.1. Type 2 channel access procedure is described in sub clause 15.2.1.2.

If an UL grant scheduling a PUSCH transmission indicates Type 1 channel access procedure, the UE shall use Type 1 channel access procedure for transmitting transmissions including the PUSCH transmission unless stated otherwise in this sub clause.

If an UL grant scheduling a PUSCH transmission indicates Type 2 channel access procedure, the UE shall use Type 2 channel access procedure for transmitting transmissions including the PUSCH transmission unless stated otherwise in this sub clause.

The UE shall use Type 1 channel access procedure for transmitting SRS transmissions not including a PUSCH transmission. UL channel access priority class p=1 is used for SRS transmissions not including a PUSCH.

If the UE is scheduled to transmit PUSCH and SRS in subframe n, and if the UE cannot access the channel for PUSCH transmission in subframe n, the UE shall attempt to make SRS transmission in subframe n according to uplink channel access procedures specified for SRS transmission.

Table 15.2.1-1 of 3GPP TS 36.213 V14.2.0, Entitled "Channel Access Priority Class for UL", is Reproduced as FIG. 5

If the 'UL duration and offset' field configures an 'UL offset' l and an 'UL duration' d for subframe n, then the UE may use channel access Type 2 for transmissions in subframes n+l+i where i=0,1, K d−1, irrespective of the channel access Type signalled in the UL grant for those subframes, if the end of UE transmission occurs in or before subframe n+l+d−1.

If the UE scheduled to transmit transmissions including PUSCH in a set subframes $n_0, n_1, \Lambda, n_{w-1}$ using PDCCH DCI Format 0B/4B, and if the UE cannot access the channel for a transmission in subframe $n_k$, the UE shall attempt to make a transmission in subframe $n_{k+1}$ according to the channel access type indicated in the DCI, where $k \in \{0,1, \Lambda$ w−2$\}$, and w is the number of scheduled subframes indicated in the DCI.

If the UE is scheduled to transmit transmissions without gaps including PUSCH in a set of subframes $n_0, n_1, \Lambda, n_{w-1}$ using one or more PDCCH DCI Format 0A/0B/4A/4B and the UE performs a transmission in subframe $n_k$ after accessing the carrier according to one of Type 1 or Type 2 UL channel access procedures, the UE may continue transmission in subframes after $n_k$ where $k \in \{0,1, \Lambda$ w−1$\}$.

If the beginning of UE transmission in subframe n+1 immediately follows the end of UE transmission in subframe n, the UE is not expected to be indicated with different channel access types for the transmissions in those subframes.

If the UE is scheduled to transmit without gaps in subframes $n_0, n_1, \Lambda, n_{w-1}$ using one or more PDCCH DCI Format 0A/0B/4A/4B, and if the UE has stopped transmitting during or before subframe $n_{k1}$, $k1 \in \{0,1, \Lambda$ w−2$\}$, and if the channel is sensed by the UE to be continuously idle after the UE has stopped transmitting, the UE may transmit in a later subframe $n_{k2}$, $k2 \in \{1, \Lambda$ w−1$\}$ using Type 2 channel access procedure. If the channel sensed by the UE is not continuously idle after the UE has stopped transmitting, the UE may transmit in a later subframe $n_{k2}$, $k2 \in \{1, \Lambda$ w−1$\}$ using Type 1 channel access procedure with the UL channel access priority class indicated in the DCI corresponding to subframe $n_{k2}$.

If the UE receives an UL grant and the DCI indicates a PUSCH transmission starting in subframe n using Type 1 channel access procedure, and if the UE has an ongoing Type 1 channel access procedure before subframe n.

if the UL channel access priority class value $p_1$ used for the ongoing Type 1 channel access procedure is same or larger than the UL channel access priority class value $p_2$ indicated in the DCI, the UE may transmit the PUSCH transmission in response to the UL grant by accessing the carrier by using the ongoing Type 1 channel access procedure.

if the UL channel access priority class value $p_1$ used for the ongoing Type 1 channel access procedure is smaller than the UL channel access priority class value $p_2$ indicated in the DCI, the UE shall terminate the ongoing channel access procedure.

If the UE is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, and if the carrier frequencies of set of carriers C is a subset of one of the sets of carrier frequencies defined in Subclause 5.7.4 in [7]

the UE may transmit on carrier $c_i \in C$ using Type 2 channel access procedure,
if Type 2 channel access procedure is performed on carrier $c_i$ immediately before the UE transmission on carrier $c_j \in C$, $i \neq j$, and
if the UE has accessed carrier $c_j$ using Type 1 channel access procedure,
where carrier $c_j$ is selected by the UE uniformly randomly from the set of carriers C before performing Type 1 channel access procedure on any carrier in the set of carriers C.

A eNB may indicate Type 2 channel access procedure in the DCI of an UL grant scheduling transmission(s) including PUSCH on a carrier in subframe n when the eNB has transmitted on the carrier according to the channel access procedure described in sub clause 15.1.1, or an eNB may indicate using the 'UL duration and offset' field that the UE may perform a Type 2 channel access procedure for transmissions(s) including PUSCH on a carrier in subframe n when the eNB has transmitted on the carrier according to the channel access procedure described in sub clause 15.1.1, or an eNB may schedule transmissions including PUSCH on a carrier in subframe n, that follows a transmission by the eNB on that carrier with a duration of $T_{short\_ul}$=25 us, if subframe n occurs within the time interval starting at $t_0$ and ending at $t_0+T_{CO}$, where $T_{CO}=T_{m\_cot,p}+T_g$, where $t_0$ is the time instant when the eNB has started transmission, $T_{mcot,p}$ value is determined by the eNB as described in sub clause 15.1, $T_g$ is the total duration of all gaps of duration greater than 25 us that occur between the DL transmission of the eNB and UL transmissions scheduled by the eNB, and between any two UL transmissions scheduled by the eNB starting from $t_0$.

The eNB shall schedule UL transmissions between $t_0$ and $t_0+T_{CO}$ in contiguous subframes if they can be scheduled contiguously.

For an UL transmission on a carrier that follows a transmission by the eNB on that carrier within a duration of $T_{short\_ul}$=25 us, the UE may use Type 2 channel access procedure for the UL transmission.

If the eNB indicates Type 2 channel access procedure for the UE in the DCI, the eNB indicates the channel access priority class used to obtain access to the channel in the DCI.

15.2.1.1 Type 1 UL Channel Access Procedure

The UE may transmit the transmission using Type 1 channel access procedure after first sensing the channel to be idle during the slot durations of a defer duration $T_d$; and after the counter N is zero in step 4. The counter N is adjusted by sensing the channel for additional slot duration(s) according to the steps described below.

1) set N=$N_{init}$, where $N_{init}$ is a random number uniformly distributed between 0 and $CW_p$, and go to step 4;
2) if N>0 and the UE chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If the UE has not transmitted a transmission including PUSCH or SRS on a carrier on which LAA Scell(s) transmission(s) are performed after step 4 in the procedure above, the UE may transmit a transmission including PUSCH or SRS on the carrier, if the channel is sensed to be idle at least in a slot duration $T_{sl}$ when the UE is ready to transmit the transmission including PUSCH or SRS, and if the channel has been sensed to be idle during all the slot durations of a defer duration $T_d$ immediately before the transmission including PUSCH or SRS. If the channel has not been sensed to be idle in a slot duration $T_{sl}$ when the UE first senses the channel after it is ready to transmit, or if the channel has not been sensed to be idle during any of the slot durations of a defer duration $T_d$ immediately before the intended transmission including PUSCH or SRS, the UE proceeds to step 1 after sensing the channel to be idle during the slot durations of a defer duration $T_d$.

The defer duration $T_d$ consists of duration $T_f$=16 us immediately followed by $m_p$ consecutive slot durations where each slot duration is $T_{sl}$=9 us, and $T_f$ includes an idle slot duration $T_{sl}$ at start of $T_f$;

A slot duration $T_{sl}$ is considered to be idle if the UE senses the channel during the slot duration, and the power detected by the UE for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in sub clause 15.2.2.

$CW_{min,p}$ and $CW_{max,p}$ are chosen before step 1 of the procedure above.

$m_p$, $CW_{min,p}$, and $CW_{max,p}$ are based on channel access priority class signalled to the UE, as shown in Table 15.2.1-1.

$X_{Thresh}$ adjustment is described in sub clause 15.2.3.

15.2.1.2 Type 2 UL Channel Access Procedure

If the UL UE uses Type 2 channel access procedure for a transmission including PUSCH, the UE may transmit the transmission including PUSCH immediately after sensing the channel to be idle for at least a sensing interval $T_{short\_ul}$=25 us. $T_{short\_ul}$ consists of a duration $T_f$=16 us immediately followed by one slot duration $T_{sl}$=9 us and $T_f$ includes an idle slot duration $T_{sl}$ at start of $T_f$. The channel is considered to be idle for $T_{short\_ul}$ if it is sensed to be idle during the slot durations of $T_{short\_ul}$.

15.2.2 Contention Window Adjustment Procedure

If the UE transmits transmissions using Type 1 channel access procedure that are associated with channel access priority class p on a carrier, the UE maintains the contention window value $CW_p$ and adjusts $CW_p$ for those transmissions before step 1 of the procedure described in sub clause 15.2.1.1, using the following procedure if the NDI value for at least one HARQ process associated with HARQ_ID_ref is toggled, for every priority class $p \in \{1,2,3,4\}$ set $CW_p=CW_{min,p}$ otherwise, increase $CW_p$ for every priority class $p \in \{1,2,3,4\}$ to the next higher allowed value;

HARQ_ID_ref is the HARQ process ID of UL-SCH in reference subframe $n_{ref}$. The reference subframe $n_{ref}$ is determined as follows If the UE receives an UL grant in subframe $n_g$, subframe $n_w$ is the most recent subframe before subframe $n_g$−3 in which the UE has transmitted UL-SCH using Type 1 channel access procedure.

If the UE transmits transmissions including UL-SCH without gaps starting with subframe $n_0$ and in subframes $n_0$, $n_1$, $\Lambda$, $n_w$, reference subframe $n_{ref}$ is subframe $n_0$, otherwise, reference subframe $n_{ref}$ is subframe $n_w$, The UE may keep the value of $CW_p$ unchanged for every priority class $p \in \{1,2,3,4\}$, if the UE scheduled to transmit transmissions without gaps including PUSCH in a set subframes $n_0$, $n_1$, $\Lambda$, $m_{w-1}$ using Type 1 channel access procedure, and if the UE is not able to transmit any transmission including PUSCH in the set of subframes.

The UE may keep the value of $CW_p$ for every priority class $p \in \{1,2,3,4\}$ the same as that for the last scheduled transmission including PUSCH using Type 1 channel access procedure, if the reference subframe for the last scheduled transmission is also $n_{ref}$.

If $CW_p=CW_{max,p}$, the next higher allowed value for adjusting $CW_p$ is $CW_{max,p}$.

If the $CW_p=CW_{max,p}$ is consecutively used K times for generation of $N_{init}$, $CW_p$ is reset to $CW_{min,p}$ only for that priority class p for which $CW_p=CW_{max,p}$ is consecutively used K times for generation of $N_{init}$. K is selected by UE from the set of values $\{1, 2, \ldots, 8\}$ for each priority class $p \in \{1,2,3,4\}$.

15.2.3 Energy Detection Threshold Adaptation Procedure

A UE accessing a carrier on which LAA Scell(s) transmission(s) are performed, shall set the energy detection threshold ($X_{Thresh}$) to be less than or equal to the maximum energy detection threshold $X_{Thresh\_max}$.

$X_{Thresh\_max}$ is determined as follows:

If the UE is configured with higher layer parameter 'maxEnergyDetectionThreshold-r14', $X_{Thresh\_max}$ is set equal to the value signalled by the higher layer parameter.

otherwise the UE shall determine $X'_{Thresh\_max}$ according to the procedure described in sub clause 15.2.3.1 if the UE is configured with higher layer parameter 'energyDetectionThresholdOffset-r14'

$X_{Thresh\_max}$ is set by adjusting $X'_{Thresh\_max}$ according to the offset value signalled by the higher layer parameter otherwise The UE shall set $X_{Thresh\_max} = X'_{Thresh\_max}$ 15.2.3.1 Default Maximum Energy Detection Threshold Computation Procedure If the higher layer parameter 'absenceOfAnyOtherTechnology-r14' indicates TRUE:

$$X^+_{Thresh\_max} = \min\left\{\begin{array}{l} T_{max} + 10\text{ dB}, \\ X_r \end{array}\right\}$$

where $X_r$ is Maximum energy detection threshold defined by regulatory requirements in dBm when such requirements are defined, otherwise $X_r = T_{max} + 10$ dB otherwise $$X'_{Thres\_max} = \max\left\{\begin{array}{l} -72 + 10 \cdot \log 10(BW\text{MHz}/20\text{ MHz})\text{ dBm}, \\ \min\left\{\begin{array}{l} T_{max}, \\ T_{max} - T_A + (P_H + 10 \cdot \log 10(BW\text{MHz}/20\text{ MHz}) - P_{TX}) \end{array}\right\} \end{array}\right\}$$

Where $T_A = 10$ dB $P_H = 23$ dBm;

$P_{TX}$ is the set to the value of $P_{CMAX\_H,c}$ as defined in [6].

$T_{max}$ (dBm)=10·log 10 (3.16228·10$^{-8}$ (mW/MHz)· BWMHz (MHz));

BWMHz is the single carrier bandwidth in MHz.

3GPP TS 36.212 states:

5.3.3.1.1A Format 0A

DCI format 0A is used for the scheduling of PUSCH in a LAA SCell.

The following information is transmitted by means of the DCI format 0A:

Carrier indicator—0 or 3 bits. This field is present according to the definitions in [3].

Flag for format0A/format1A differentiation—1 bit, where value 0 indicates format 0A and value 1 indicates format 1A.

PUSCH trigger A—1 bit, where value 0 indicates non-triggered scheduling and value 1 indicates triggered scheduling as defined in section 8.0 of [3].

Timing offset—4 bits as defined in section 8.0 of [3].

When the PUSCH trigger A is set to 0,

The field indicates the absolute timing offset for the PUSCH transmission.

Otherwise,

The first two bits of the field indicate the timing offset, relative to the UL offset I as defined in section 13A of [3], for the PUSCH transmission.

The last two bits of the field indicate the time window within which the scheduling of PUSCH via triggered scheduling is valid.

Resource block assignment—5 or 6 bits provide the resource allocation in the UL subframe as defined in section 8.1.4 of [3]

Modulation and coding scheme—5 bits as defined in section 8.6 of [3]

HARQ process number—4 bits.

New data indicator—1 bit

Redundancy version—2 bits as defined in section 8.6.1 of [3]

TPC command for scheduled PUSCH—2 bits as defined in section 5.1.1.1 of [3]

Cyclic shift for DM RS and OCC index—3 bits as defined in section 5.5.2.1.1 of [2]

CSI request—1, 2 or 3 bits as defined in section 7.2.1 of [3]. The 2-bit field applies to UEs configured with no more than five DL cells and to UEs that are configured with more than one DL cell and when the corresponding DCI format is mapped onto the UE specific search space given by the C-RNTI as defined in [3];

UEs that are configured by higher layers with more than one CSI process and when the corresponding DCI format is mapped onto the UE specific search space given by the C-RNTI as defined in [3];

UEs that are configured with two CSI measurement sets by higher layers with the parameter csi-MeasSubframe-Set, and when the corresponding DCI format is mapped onto the UE specific search space given by the C-RNTI as defined in [3];

the 3-bit field applies to UEs that are configured with more than five DL cells and when the corresponding DCI format is mapped onto the UE specific search space given by the C-RNTI as defined in [3];

otherwise the 1-bit field applies

SRS request—1 bit. The interpretation of this field is provided in section 8.2 of [3]

PUSCH starting position—2 bits as specified in Table 5.3.3.1.1A-1.

PUSCH ending symbol—1 bit, where value 0 indicates the last symbol of the subframe and value 1 indicates the second to last symbol of the subframe.

Channel Access type—1 bit as defined in section 15.2 of [3]

Channel Access Priority Class—2 bits as defined in section 15.2 of [3]

If the number of information bits in format 0A mapped onto a given search space is less than the payload size of format 1A for scheduling the same serving cell and mapped onto the same search space (including any padding bits appended to format 1A), zeros shall be appended to format 0A until the payload size equals that of format 1A.

TABLE 5.3.3.1.1A-1

PUSCH starting position

| Value | PUSCH starting position |
|---|---|
| 00 | symbol 0 |
| 01 | 25 µs in symbol 0 |

TABLE 5.3.3.1.1A-1-continued

PUSCH starting position

| Value | PUSCH starting position |
|---|---|
| 10 | (25 + TA) is in symbol 0 |
| 11 | symbol 1 |

5.3.3.1.1B Format 0B

DCI format 0B is used for the scheduling of PUSCH in each of multiple subframes in a LAA SCell. The following information is transmitted by means of the DCI format 0B:

Carrier indicator—0 or 3 bits. This field is present according to the definitions in [3].

PUSCH trigger A—1 bit, where value 0 indicates non-triggered scheduling and value 1 indicates triggered scheduling as defined in section 8.0 of [3].

Timing offset—4 bits as defined in section 8.0 of [3].

When the PUSCH trigger A is set to 0,

The field indicates the absolute timing offset for the PUSCH transmission.

Otherwise,

The first two bits of the field indicate the timing offset, relative to the UL offset I as described in section 13A of [3], for the PUSCH transmission.

The last two bits of the field indicate the time window within which the scheduling of PUSCH via triggered scheduling is valid.

Number of scheduled subframes—1 or 2 bits. The 1-bit field applies when maxNumberOfSchedSubframes-Format0B-r14 is configured by higher layers to two, otherwise the 2-bit field applies.

Resource block assignment—5 or 6 bits provide the resource allocation in the UL subframe as defined in section 8.1.4 of [3].

Modulation and coding scheme—5 bits as defined in section 8.6 of [3].

HARQ process number—4 bits. The 4-bit applies to the first scheduled subframe, and the HARQ process numbers for other scheduled subframes are defined in section 8.0 of [3].

New data indicator—maxNumberOfSchedSubframes-Format0B-r14 bits. Each scheduled PUSCH corresponds to 1 bit.

Redundancy version—maxNumberOfSchedSubframes-Format0B-r14 bits. Each scheduled PUSCH corresponds to 1 bit as defined in section 8.6.1 of [3].

TPC command for scheduled PUSCH—2 bits as defined in section 5.1.1.1 of [3].

Cyclic shift for DM RS and OCC index—3 bits as defined in section 5.5.2.1.1 of [2].

CSI request—1, 2 or 3 bits as defined in section 7.2.1 of [3]. The 2-bit field applies to UEs configured with no more than five DL cells and to UEs that are configured with more than one DL cell and when the corresponding DCI format is mapped onto the UE specific search space given by the C-RNTI as defined in [3];

UEs that are configured by higher layers with more than one CSI process and when the corresponding DCI format is mapped onto the UE specific search space given by the C-RNTI as defined in [3];

UEs that are configured with two CSI measurement sets by higher layers with the parameter csi-MeasSubframe-Set, and when the corresponding DCI format is mapped onto the UE specific search space given by the C-RNTI as defined in [3];

the 3-bit field applies to UEs that are configured with more than five DL cells and when the corresponding DCI format is mapped onto the UE specific search space given by the C-RNTI as defined in [3];

otherwise the 1-bit field applies.

SRS request—2 bits. The interpretation of this field is provided in section 8.2 of [3].

PUSCH starting position—2 bits as specified in Table 5.3.3.1.1A-1 applicable to only the first scheduled subframe.

PUSCH ending symbol—1 bit, where value 0 indicates the last symbol of the last scheduled subframe and value 1 indicates the second to last symbol of the last scheduled subframe.

Channel Access type—1 bit as defined in section 15.2 of [3].

Channel Access Priority Class—2 bits as defined in section 15.2 of [3].

If the number of information bits in format OB is equal to the payload size for DCI format 1, 2, 2A, 2B, 2C or 2D associated with the configured DL transmission mode in the same serving cell, one zero bit shall be appended to format OB.

[ . . . ]

5.3.3.1.8A Format 4A

DCI format 4 is used for the scheduling of PUSCH in a LAA SCell with multi-antenna port transmission mode.

The following information is transmitted by means of the DCI format 4A:

Carrier indicator—0 or 3 bits. The field is present according to the definitions in [3].

PUSCH trigger A—1 bit, where value 0 indicates non-triggered scheduling and value 1 indicates triggered scheduling as defined in section 8.0 of [3].

Timing offset—4 bits as defined in section 8.0 of [3].

When the PUSCH trigger A is set to 0,

The field indicates the absolute timing offset for the PUSCH transmission.

Otherwise,

The first two bits of the field indicate the timing offset, relative to the UL offset/as defined in section 13A of [3], for the PUSCH transmission.

The last two bits of the field indicate the time window within which the scheduling of PUSCH via triggered scheduling is valid.

Resource block assignment—5 or 6 bits provide the resource allocation in the UL subframe as defined in section 8.1.4 of [3].

HARQ process number—4 bits.

Redundancy version—2 bits as defined in section 8.6.1 of [3] which is common for both transport blocks.

TPC command for scheduled PUSCH—2 bits as defined in section 5.1.1.1 of [3]

Cyclic shift for DM RS and OCC index—3 bits as defined in section 5.5.2.1.1 of [2]

CSI request—1, 2 or 3 bits as defined in section 7.2.1 of [3]. The 2-bit field applies to UEs configured with no more than five DL cells and to UEs that are configured with more than one DL cell;

UEs that are configured by higher layers with more than one CSI process;

UEs that are configured with two CSI measurement sets by higher layers with the parameter csi-MeasSubframeSet;

the 3-bit field applies to UEs that are configured with more than five DL cells;

otherwise the 1-bit field applies.

SRS request—2 bits as defined in section 8.2 of [3].
PUSCH starting position—2 bits as specified in Table 5.3.3.1.1A-1.
PUSCH ending symbol—1 bit, where value 0 indicates the last symbol of the subframe and value 1 indicates the second to last symbol of the subframe.
Channel Access type—1 bit as defined in section 15.2 of [3].
Channel Access Priority Class—2 bits as defined in section 15.2 of [3].
In addition, for transport block 1:
Modulation and coding scheme and redundancy version—5 bits as defined in section 8.6 of [3].
New data indicator—1 bit.
In addition, for transport block 2:
Modulation and coding scheme and redundancy version—5 bits as defined in section 8.6 of [3].
New data indicator—1 bit.
Precoding information and number of layers: number of bits as specified in Table 5.3.3.1.8-1. Bit field as shown in Table 5.3.3.1.8-2 and Table 5.3.3.1.8-3. Note that TPMI for 2 antenna ports indicates which codebook index is to be used in Table 5.3.3A.2-1 of [2], and TPMI for 4 antenna ports indicates which codebook index is to be used in Table 5.3.3A.2-2, Table 5.3.3A.2-3, Table 5.3.3A.2-4 and Table 5.3.3A.2-5 of [2]. If both transport blocks are enabled, transport block 1 is mapped to codeword 0; and transport block 2 is mapped to codeword 1. In case one of the transport blocks is disabled, the transport block to codeword mapping is specified according to Table 5.3.3.1.5-2. For a single enabled codeword, indices 24 to 39 in Table 5.3.3.1.8-3 are only supported for retransmission of the corresponding transport block if that transport block has previously been transmitted using two layers.

If the number of information bits in format 4A is equal to the payload size for DCI format 1, 2, 2A, 2B, 2C or 2D associated with the configured DL transmission mode in the same serving cell, one zero bit shall be appended to format 4A.

5.3.3.1.8B Format 4B

DCI format 4B is used for the scheduling of PUSCH with multi-antenna port transmission mode in each of multiple subframes in a LAA SCell.

The following information is transmitted by means of the DCI format 4B:
Carrier indicator—0 or 3 bits. The field is present according to the definitions in [3].
PUSCH trigger A—1 bit, where value 0 indicates non-triggered scheduling and value 1 indicates triggered scheduling as defined in section 8.0 of [3].
Timing offset—4 bits as defined in section 8.0 of [3].
When the PUSCH trigger A is set to 0,
The field indicates the absolute timing offset for the PUSCH transmission.
Otherwise,
The first two bits of the field indicate the timing offset, relative to the UL offset/as defined in section 13A of [3], for the PUSCH transmission.
The last two bits of the field indicate the time window within which the scheduling of PUSCH via triggered scheduling is valid.
Number of scheduled subframes—1 or 2 bits. The 1-bit field applies when maxNumberOfSchedSubframes-Format4B-r14 is configured by higher layers to two, otherwise the 2-bit field applies.
Resource block assignment—5 or 6 bits provide the resource allocation in the UL subframe as defined in section 8.1.4 of [3].
HARQ process number—4 bits. The 4-bit applies to the first scheduled subframe, and the HARQ process numbers for other scheduled subframes are defined in section 8.0 of [3].
Redundancy version—maxNumberOfSchedSubframes-Format4B-r14 bits. Each scheduled PUSCH corresponds to 1 bit as defined in section 8.6.1 of [3]. Redundancy version is common for both transport blocks.
TPC command for scheduled PUSCH—2 bits as defined in section 5.1.1.1 of [3].
Cyclic shift for DM RS and OCC index—3 bits as defined in section 5.5.2.1.1 of [2].
CSI request—1, 2 or 3 bits as defined in section 7.2.1 of [3]. The 2-bit field applies to UEs configured with no more than five DL cells and to
UEs that are configured with more than one DL cell;
UEs that are configured by higher layers with more than one CSI process;
UEs that are configured with two CSI measurement sets by higher layers with the parameter csi-MeasSubframeSet;
the 3-bit field applies to UEs that are configured with more than five DL cells;
otherwise the 1-bit field applies.
SRS request—2 bits as defined in section 8.2 of [3].
PUSCH starting position—2 bits as specified in Table 5.3.3.1.1A-1 applicable to only the first scheduled subframe.
PUSCH ending symbol—1 bit, where value 0 indicates the last symbol of the last scheduled subframe and value 1 indicates the second to last symbol of the last scheduled subframe.
Channel Access type—1 bit as defined in section 15.2 of [3].
Channel Access Priority Class—2 bits as defined in section 15.2 of [3].
In addition, for transport block 1:
Modulation and coding scheme and redundancy version—5 bits as defined in section 8.6 of [3].
New data indicator—maxNumberOfSchedSubframes-Format4B-r14 bits. Each scheduled PUSCH corresponds to 1 bit.
In addition, for transport block 2:
Modulation and coding scheme and redundancy version—5 bits as defined in section 8.6 of [3].
New data indicator—maxNumberOfSchedSubframes-Format4B-r14 bits. Each scheduled PUSCH corresponds to 1 bit.
Precoding information and number of layers: number of bits as specified in Table 5.3.3.1.8-1. Bit field as shown in Table 5.3.3.1.8-2 and Table 5.3.3.1.8-3. Note that TPMI for 2 antenna ports indicates which codebook index is to be used in Table 5.3.3A.2-1 of [2], and TPMI for 4 antenna ports indicates which codebook index is to be used in Table 5.3.3A.2-2, Table 5.3.3A.2-3, Table 5.3.3A.2-4 and Table 5.3.3A.2-5 of [2]. If both transport blocks are enabled, transport block 1 is mapped to codeword 0; and transport block 2 is mapped to codeword 1. In case one of the transport blocks is disabled, the transport block to codeword mapping is specified according to Table 5.3.3.1.5-2. For a single enabled codeword, indices 24 to 39 in Table 5.3.3.1.8-3 are only supported for retransmission of the corresponding transport block if that transport block has previously been transmitted using two layers.

If the number of information bits in format 4B is equal to the payload size for DCI format 1, 2, 2A, 2B, 2C or 2D associated with the configured DL transmission mode in the same serving cell, one zero bit shall be appended to format 4B.

Final Report of 3GPP TSG RAN WG1 #86bis v1.0.0 (Lisbon, Portugal, 10-14 Oct. 2016) states:
 Multi-Antenna Scheme for New Radio Interface
 Beam Management
 R1-1609248 On the impact of UE rotationLG Electronics
  Proposal 1: UE triggering based beam management should be supported in NR.
  Proposal 2: Consider omni-directional single or cross-pol antenna for UE above 6 GHz.
  Proposal 3: (Semi) OL MIMO techniques can be taken into consideration when UE rotates.
  Proposal 4: UE centric MCS back-off mechanisms should be studied for NR.
 R1-1609395 Discussion of DL hybrid beamforming procedure Lenovo
  Proposal 1: RSRP-based beam measurement and feedback scheme should be considered for beam selection and refinement.
  Proposal 2: Spatial multiplexing at the TRP should be supported by the beam measurement and feedback scheme.
  Proposal 3: The standard impact of UE RX beam selection and refinement should be minimized, provided a UE is provided sufficient RS resource to tune its RX beam.
  Proposal 4: CSI-RS and feedback can be used for CSI acquisition for given analog beams.
  Proposal 5: The interaction between analog beaming and digital beamforming should be studied.
 R1-1609754 Beam management principles Ericsson
  Proposal 1: Handle beam management within the CSI framework in NR (i.e. the framework used for link adaptation of data transmission).
  Proposal 2: Use CSI-RS for beam management measurements
  Proposal 3: In the beam management procedures, one or multiple beam pair links (BPLs) are monitored by the network using uplink measurements by the TRPs and/or downlink measurements from the UE.
  Proposal 4: Support a configurable (time multiplexed, frequency multiplexed or both) sweepof CSI-RS in a slot or subframe for beam management measurements
  Proposal 5: Study which different types of frequency allocations that should be supported for CSI-RS used for beam management measurements
  Proposal 6: When triggering a sweep of K CSI-RS transmissions (K beams), it is also indicated to the UE whether it may assume that the same beam is used for the K transmissions or not as to distinguish between P-1/P-2 and P-3 procedure.
 R1-1610487 Way Forward on beam management Ericsson, Intel, CATT, InterDigital Communications
  Possible agreements:
   At least CSI-RS can be used for measurements to support the beam management processes P1, P2, P3
   When used for P1/P2/P3, optimization of the CSI-RS signal structure can be considered for this purpose (as opposed to e.g. link adaptation)
   Additional RS could also be considered such as DMRS and synchronization signals
 R1-1610516 Way Forward on Beam management RS Samsung, Intel, Verizon Wireless
  NR supports two types of RS for beam management procedures (P-1, P-2 and P-3):
   Beam reference signals (BRS):
    BRS is cell-specifically configured and periodically transmitted.
    FFS: BRS is also used for L3 mobility
   CSI-RS:
    CSI-RS is UE-specifically configured.
    The signal structure for CSI-RS can be specifically optimized based on whether the CSI-RS is used for P1, P2 or P3
    Note: CSI-RS is also used for CSI acquisition
 R1-1610658 Way Forward on beam management Ericsson, Samsung, Intel
  Beam management procedures can utilize at least the following two RS types:
   RS used for mobility, at least for P-1:
    Note: This RS can be used for P-1 when beam sweeping of mobility signal is used
   CSI-RS, for P-1, P-2, and P-3:
    CSI-RS is UE-specifically configured.
    Multiple UE may be configured with the same CSI-RS
    The signal structure for CSI-RS can be specifically optimized based on whether the CSI-RS is used for P1, P2 or P3
    Note: CSI-RS can also be used for CSI acquisition
    Note: The CSI-RS can be used for P-1 in case mobility signal is single beam or when SFN transmission is used, e.g. across multi-TRP/Panel
  Additional RS could also be considered such as DMRS and synchronization signals
  Also supported by Interdigital, CATT.
  Working Sssumptions:
  Beam management procedures can utilize at least the following RS type(s):
   RS defined for mobility purpose at least in connected mode
    FFS: RS can be NR-SS or CSI-RS or newly designed RS
    Others are not precluded
   CSI-RS:
    CSI-RS is UE-specifically configured
    Multiple UE may be configured with the same CSI-RS
    The signal structure for CSI-RS can be specifically optimized for the particular procedure
    Note: CSI-RS can also be used for CSI acquisition
  Other RS could also be considered for beam management such as DMRS and synchronization signals
 R1-1610891 WF on Group-based Beam Management ZTE, ZTE Microelectronics, ASTRI, Nokia, ASB, CATT
  Agreements:
   Group based beam management is to be further studied:
    Definition of beam grouping:
     Beam grouping=for TRP(s) or UE to group multiple Tx and/or Rx beam(s) and/or beam pair(s) into one subset of beams
    FFS detailed mechanisms for beam grouping, reporting, beam-group based indication for beam measurement, beam-based transmission or beam switching, etc.
    Some examples can be found in R1-1610891 and R1-1609414

R1-1610825 WF on Beam management CATT, CATR, CMCC, Xinwei

Agreements:

For downlink, NR supports beam management with and without beam-related indication
  When beam-related indication is provided, information pertaining to UE-side beamforming/receiving procedure used for data reception can be indicated through QCL to UE
    FFS: Information other than QCL
  FFS: When beam-related indication is provided, information pertaining to the Tx beam used for data transmission is indicated to UE
For downlink, based on RS (used for beam management) transmitted by TRP, UE reports information associated with N selected Tx beams
  Study how the N Tx beams can be selected
  Study the case where N comprises of all Tx beams
  Study UE reporting information
  Note: N can be equal to 1

R1-1610923 WF on Beam Reporting for NR LG Electronics, Intel, NTT DOCOMO, MediaTek Agreements:

Support at least network triggered aperiodic beam reporting:
  Aperiodic beam reporting is supported under P-1, P-2, and P-3 related operations
  FFS beam reporting details
  FFS: UE assisted/initiated aperiodic beam reporting
  FFS: In case of UE assisted/initiated aperiodic beam reporting, UE request message can be transmitted on a reserved/dedicated/common uplink channel (e.g. physical random access channel, physical uplink control channel).
Further study is needed whether semi-persistent/periodic/event-triggered beam (network triggered or UE assisted/initiated) reporting is needed R1-1610511 WF on Beam Management for DL Control Channel ZTE, ZTE Microelectronics, Intel, Xinwei Agreements:

Support using same or different beams on control channel and the corresponding data channel transmissions
  FFS the antenna ports for control channel and the corresponding data channel (e.g., sharing some ports or not)
Study detailed aspects related to beams/beam pairs indication/reporting involving usage of control and data channels and involving one or more TRPs R1-1610971 WF on definition of Beam reciprocity Samsung, Qualcomm, InterDigital, Intel, IITM, IITH, CeWIT, Tejas Networks, KT, MediaTek, AT&T, Verizon, Motorola Mobility, Reliance Jio Working Assumption:

The followings are defined as Tx/Rx beam correspondence at TRP and UE:
Tx/Rx beam correspondence at TRP holds if at least one of the following is satisfied:
  TRP is able to determine a TRP Rx beam for the uplink reception based on UE's downlink measurement on TRP's one or more Tx beams.
  TRP is able to determine a TRP Tx beam for the downlink transmission based on TRP's uplink measurement on TRP's one or more Rx beams
Tx/Rx beam correspondence at UE holds if at least one of the following is satisfied:
  UE is able to determine a UE Tx beam for the uplink transmission based on UE's downlink measurement on UE's one or more Rx beams.
  UE is able to determine a UE Rx beam for the downlink reception based on TRP's indication based on uplink measurement on UE's one or more Tx beams.
More refined definition can still be discussed R1-1610894 UL beam management Samsung, Huawei, Intel Agreements:

UL beam management is to be further studied in NR
  Similar procedures can be defined as DL beam management with details FFS, e.g.:
    U-1: is used to enable TRP measurement on different UE Tx beams to support selection of UE Tx beams/TRP Rx beam(s)
      Note: this is not necessarily useful in all cases
    U-2: is used to enable TRP measurement on different TRP Rx beams to possibly change/select inter/intra-TRP Rx beam(s)
    U-3: is used to enable TRP measurement on the same TRP Rx beam to change UE Tx beam in the case UE uses beamforming
  FFS Indication of information related to Tx/Rx beam correspondence is supported
  Study UL beam management based on:
    PRACH
    SRS
    DM-RS
    Other channels and reference signals are not precluded
  Study uplink beam management procedure by considering the Tx/Rx beam correspondence
    For the case of TRP and UE have Tx/Rx beam correspondence
    For the case of TRP has no Tx/Rx beam correspondence and/or UE has no Tx/Rx beam correspondence R1-1610964 WF on Beam recovery Samsung, Qualcomm, Intel, KT, LGE, Ericsson Also supported by Nokia Agreements:

NR supports mechanism(s) in the case of link failure and/or blockage for NR
  Whether to use new procedure is FFS
Study at least the following aspects:
  Whether or not an DL or UL signal transmission for this mechanism is needed
    E.g., RACH preamble sequence, DL/UL reference signal, control channel, etc.
  If needed, resource allocation for this mechanisms
    E.g., RACH resource corresponding mechanism, etc.

R1-1611014 WF on Beam management CATT, CATR, CMCC, Xinwei, Samsung CSI Acquisition R1-1610716 Way Forward on CSI-RS and CSI reporting in NR LG Electronics, Ericsson, Intel, Samsung Decision: The document is noted, modified and agreed as follows:

Agreements:

At least for CSI acquisition, NR supports CSI-RS, SRS
  FFS: Use of DL DMRS for CSI measurement
NR supports aperiodic transmission of CSI-RS
For CSI-RS transmission, NR supports at least one of following:
  Semi-persistent transmission
    Preconfigured CSI-RS resources can be activated or de-activated
      FFS: Activation/De-activation mechanism Periodic transmission
Periodic CSI-RS can be configured by higher layer
FFS: mechanisms (e.g. protocol layer) for dynamic control of activation/deactivation for semi-persistent CSI-RS
FFS: mechanisms to provide reliable activation/deactivation for semi-persistent CSI-RS
NR supports aperiodic CSI reporting
NR supports at least one of following:
Periodic CSI reporting
It can be configured by higher layer
Semi-persistent CSI reporting
Configuration of CSI reporting can be activated or de-activated
FFS: Activation and de-activation mechanism
Study periodic/aperiodic/semi-persistent CSI reporting by using CSI-RS
FFS using other RSs
FFS on necessary configurations, conditions, situations and use cases
With regard to relating CSI-RS transmission and CSI reporting, following combinations are supported at least
Aperiodic CSI reporting with aperiodic CSI-RS
Aperiodic CSI reporting with semi-persistent/periodic CSI-RS
Semi-persistent/periodic CSI reporting with semi-persistent/periodic CSI-RS
To support combinations above more flexibly, NR should allow independent control of CSI-RS indication and CSI reporting indication timings.
'indication' above may refer to triggering, activation, and deactivation depending on type of RS/reporting.
Further study is needed how to guarantee appropriate time gap between indication of CSI-RS transmission and CSI-RS
Further study is needed how to guarantee appropriate time gap between CSI-RS and CSI reporting
Note: This does not preclude joint control of CSI-RS indication and CSI reporting indication.
R1-1610907 WF on CSI-RS resource pooling Ericsson, Samsung, LG, Nokia (R1-1610705)
Agreements:
A CSI-RS resource set should be studied whereby CSI-RS resources within the set may be dynamically shared amongst users
Study CSI-RS resources configuration in 2 steps
Step 1: Pre-configure a set of K CSI-RS resources for one or more users through UE-specific RRC configuration
Step 2: For a given user, dynamically indicate N out of K (where N>=1) of the CSI-RS resources from the set to enable CSI measurement in a given time window
Study the following alternatives
Alt 1: Dynamic signaling through DCI
Alt 2: Dynamic signaling through MAC CE
The CSI-RS transmissions can be dynamically indicated as one shot or multi-shot within the window
The configured CSI-RS resource pool can be used for channel/interference measurement
Configure multi sets of CSI-RS resources for one UE
R1-1610517 Way Forward on CSI measurement and reporting Huawei, HiSilicon, Ericsson, Qualcomm
Agreements:
The feasibility of CSI-RS transmission and CSI reporting in a self-contained structure (e.g., subframe) should be studied, considering UE implementation complexity
FFS: DM-RS based CSI reporting
Interference measurement under different interference hypothesis should be supported in NR
Definition of interference hypothesis and mechanism of interference measurement is FFS
Reference Signal Design and QCL
R1-1608675 On Quasi-Co-Location/Beam for NR MIMO ZTE, ZTE Microelectronics
Observation 1: Delay offset among different beam-based channel is significant.
Observation 2: Similar channel properties can be observed when the beam-pairs point to the adjacent direction.
Proposal 1: Introducing a new set of "Qusai-Co-beam" parameters e.g. angle of arrival, angular spread to QCL parameters. Grouping of antenna ports according to quasi-co-beam properties is fed back by the UE.
Proposal 2: Support flexible configuration of the QCL parameters for different applications
Proposal 3: Support QCL association of UL ports to DL ports considering channel reciprocity
R1-1610492 Way Forward on the CSI-RS configuration for NR Intel, Samsung, Ericsson
Agreements:
CSI-RS configuration for NR includes at least 'number of antenna ports'
Configuration can be explicit or impliit
The number of CSI-RS antenna ports can be independently configured for periodic/semi-persistent CSI reporting and aperiodic CSI reporting
Possible working assumption:
The number of antenna ports supported for CSI-RS configuration includes at least the following values 1,2,4,8,12,16,20,24,28,32
Working Assumption:
The number of antenna ports supported for CSI-RS configuration includes at least the following values 1,2,4,8,[12],16,[20],[24],[28],32
RAN1 will update/remove above bracket parts in the next meeting
Study e.g., performance, scenario, RS overhead, RS pattern considering the frame structure, reuse of hardware between NR and LTE
R1-1610520 Way Forward on the QCL for NR Intel, LGE, Ericsson, NTT DOCOMO, Samsung
Agreements:
QCL framework in NR is extended with new spatial QCL parameter(s) to support UE side beamforming/receiving procedure
FFS details (e.g., receive angle of arrival, transmit angle of departure, spatial correlation of receiver antennas, Rx/Tx beamforming, etc.)
For DM-RS antenna ports, NR supports:
All ports are QCL-ed
Not all ports are QCL-ed
FFS on details
FFS, e.g.:
QCL between antenna ports transmitted on different CCs
QCL between CSI-RS antenna ports within one CSI-RS resource
All ports are QCL-ed
Not all ports are QCL-ed QCL between CSI-RS antenna ports within two or more CSI-RS resources
All ports are QCL-ed
Not all ports are QCL-ed
QCL of a DM-RS antenna port with other RS types
QCL considering channel reciprocity
R1-1610513 Way Forward on QCL for NR ZTE Corporation, ZTE Microelectronics
Agreements:
Flexible configuration/indication of the QCL assumption should be studied in NR:
Possible grouping of the QCL parameters should be studied:
e.g., average gain, average delay
e.g., angle of arrival/departure, delay spread, Doppler spread
RACH Procedure
R1-1610489 Way Forward on RACH procedure for multi-beam operation NTT DOCOMO, ETRI, Qualcomm, Nokia, Alcatel-Lucent Shanghai-Bell, ZTE
Agreements:
When Tx/Rx reciprocity is available at gNB at least for multiple beams operation, the following RACH procedure is considered for at least UE in idle mode
Association between one or multiple occasions for DL broadcast channel/signal and a subset of RACH occasions is informed to UE by broadcast system information or known to UE
FFS: Signaling of "non-association"
Detailed design for RACH preamble should be further studied
Based on the DL measurement and the corresponding association, UE selects the subset of RACH occasions
FFS: Tx beam selection for RACH preamble transmission
At gNB, the DL Tx beam for the UE can be obtained based on the detected RACH preamble and would be also applied to Message 2
UL grant in message 2 may indicate the transmission timing of message 3
For the cases with and without Tx/Rx reciprocity, the common random access procedure should be strived
When Tx/Rx reciprocity is not available, the the following could be further considered for at least UE in idle mode
Whether or how to report DL Tx beam to gNB, e.g., RACH preamble/resource
Msg. 3
Whether or how to indicate UL Tx beam to the UE, e.g., RAR
R1-1610783 WF on RACH Procedure for Multi-beam without gNB reciprocity ZTE, ZTE Microelectronics, Nokia, NTT DOCOMO
RACH occasion:
A time-frequency resource and a subset of preambles.
Subset of RACH occasions:
One or more RACH occasions
Multiple/repeated UE preamble transmission within a subset of RACH occasions is informed by broadcast system information
To cover gNB RX beam sweeping in case of NO Tx/Rx reciprocity at the gNB
Agreements:
RACH resource:
A time-frequency resource to send RACH preamble
Whether UE needs to transmit one or multiple/repeated preamble within a subset of RACH resoueces can be informed by broadcast system information
For example, to cover gNB RX beam sweeping in case of NO Tx/Rx reciprocity at the gNB
R1-1610849 WF on definition of Beam reciprocity Samsung
The followings are defined for Tx/Rx beam reciprocity at TRP and UE:
Tx/Rx beam reciprocity at TRP:
TRP is able to determine a TRP Rx beam for the uplink reception based on UE's downlink measurement report on TRP's Tx beam.
TRP is able to determine a TRP Tx beam for the downlink transmission based on TRPs uplink measurement on TRP's Rx beams
Tx/Rx beam reciprocity at UE:
UE is able to determine a UE Tx beam for the uplink transmission based on UE's downlink measurement on UE's Rx beams.
UE is able to determine a UE Rx beam for the downlink reception based TRP uplink measurement on UE's Tx beam.
R1-1610962 WF on Unified RACH Procedure ZTE, ZTE Microelectronics, NTT DOCOMO, Nokia, Alcatel-Lucent Shanghai Bell, Sharp, Intel
R1-1610960 WF on RACH Preamble NTT DOCOMO, Intel, Sharp, ZTE
Agreements:
NR supports multiple RACH preamble formats, including at least
RACH preamble format with longer preamble length
RACH preamble format with shorter preamble length
FFS how many signatures (e.g. number of RACH sequences, payload size, etc.)
Multiple/repeated RACH preambles in a RACH resource is supported
FFS: How to support single-beam and/or multi-beam operation
FFS: Preamble could be the same or different
Numerology for RACH preamble can be different depending on frequency ranges
FFS: How many numerologies will be supported per frequency range
FFS: Numerology for RACH preamble can be different or the same from that for the other UL data/control channels
R1-1611011 WF on RACH Preamble Evaluation Assumption Nokia, Alcatel-Lucent Shanghai Bell, NTT DOCOMO
Agreements:
In the evaluation for RACH preamble transmission and RACH resource selection, companies report the following assumptions
Support of Rx beam sweeping at the base station
Support of coverage, e.g., the values defined in TR38.913
Final Report of 3GPP TSG RAN WG1 #87 v1.0.0 (Reno, USA, 14-18 Nov. 2016) states:
Beam Management and CSI Acquisition
R1-1613287 WF on NR NW Initiated Beam Switching Intel, Ericsson
Also supported by CATT
Agreements:
NR to provide robustness against beam pair link blocking
Study mechanisms to achieve the above purpose E.g., by enabling PDCCH/PDSCH monitoring with N beams
E.g., N=1, 2, ...
E.g., TDM monitoring, simultaneous monitoring, etc.
E.g., by enabling composite beams via e.g., SFBC and/or multi-stage control channel
The examples are not intended to be exhaustive R1-1613171 WF on periodic and semi-persistent CSI reporting Samsung, NTT DOCOMO, Ericsson, LGE
Agreements:
For NR, support both periodic and semi-persistent CSI reporting:
For periodic: higher-layer configuration of reporting periodicity and timing offset
FFS for the case of semi-persistent CSI reporting w.r.t. reporting periodicity and timing offset
FFS on detailed signaling R1-1613542 WF on Beam Correspondence Samsung, NTT DOCOMO, InterDigital, MediaTek, Convida Wireless, Sharp
Possible Agreements:
Support indication of UE's capability on reciprocity calibration to TRP.
Study whether or not procedure(s) for determining reciprocity calibration is needed
e.g. as shown in appendix
e.g. metrics to be considered SNR/Power (beam-quality), CSI, and others R1-1613682 WF on Beam Correspondence Samsung, NTT DOCOMO, InterDigital, MediaTek, Convida Wireless, Sharp
Agreements:
Companies are encouraged to refine the definition of beam correspondence, if necessary
Note: whether or not to introduce this definition in NR is a separate topic
Under the refined definition of beam correspondence (if any), study whether or not mechanism(s) for determining UE's beam correspondence is needed.
the study may consider the following aspects
e.g. metrics to be considered SNR/Power (beam-quality), CSI, and others
e.g. values of the metrics at which beam correspondence is declared
e.g., complexity/overhead
e.g., possibility of supporting reporting to the gNB about beam correspondence at the UE R1-1613365 WF on beam management for control and data channel ZTE, ZTE Microelectronics, ASTRI, Intel
Also supported by Samsung
Possible Agreements:
For downlink control channel, NR supports beam management with and without beam-related indication
When beam-related indication is provided, information pertaining to UE-side beamforming/receiving procedure used for downlink control channel reception can be indicated through QCL to UE
FFS: Information other than QCL
FFS: DL control and data channels share the same beam resource pool at least for beam-related indication
e.g. A beam resource pool is a pool of reference signal resources for beam group indication via QCL
Study separate beam-related indication for DL control and data channels within the shared beam resource pool R1-1613670 WF on beam management for control and data channel ZTE, ZTE Microelectronics, ASTRI, Intel, Samsung, LGE
Agreements:
NR supports with and without a downlink indication to derive QCL assumption for assisting UE-side beamforming for downlink control channel reception
FFS: details
E.g., QCL assumption details
E.g., indication signaling (e.g. DCI, MAC CE, RRC, etc.)
E.g., beam-related indication for DL control and data channels R1-1613740 WF on Group-based Beam Management ZTE, ZTE Microelectronics, ASTRI (Revision of R1-1613366)

R1-1613725 WF on event-driven UL transmission in NR LG Electronics, ZTE, ZTE Microelectronics, Intel, NTT DOCOMO, Samsung, Nokia, ASB R1-1613774 WF on UE initiated UL transmission in NR LG Electronics, Ericsson, Huawei, HiSilicon
Also supported by MTK
Agreements:
NR should study the necessity of event-driven UE initiated UL transmission, e.g., in the event of beam quality degradation
E.g. due to UE mobility/rotation, blockage, and/or link failure, etc.
FFS: details of event(s) of beam quality degradation R1-1613288 WF on NR UE requested beam switching Intel Corporation, Samsung R1-1613157 WF on beam reporting LG Electronics, Intel, Samsung R1-1613589 WF on beam indication and reporting Samsung, Ericsson, NTT DOCOMO, Intel, Verizon, KT R1-1613727 WF on beam indication and reporting Samsung, Ericsson, NTT DOCOMO, Intel, LGE, Verizon, KT R1-1613649 WF on UL Beam Management Huawei, HiSilicon, China Unicom, Softbank, Xinwei, MTK, NTT DOCOMO Final Report of 3GPP TSG RAN WG1 #88 v1.0.0 (Athens, Greece, 13-17 Feb. 2017) states:
Beam Management
R1-1701797 High level views on beam management for NR MIMO ZTE, ZTE Microelectronics
R1-1701827 Summary of [NRAH1-01] Email discussion on Evaluation on Beam Management ZTE, ZTE Microelectronics
Proposal 1: Consider the aspects (in Section 2) of beam management for evaluation.
Proposal 2: Adopt the evaluation assumptions in Table 1 and Table 2 respectively for link level evaluation and system level evaluation for beam management.
Decision: The document is noted, further revised and agreed in R1-1703533.
Beam Management Framework
R1-1702934 Measurement and reporting information for beam reporting Samsung
Proposal 1: The value N (#selected beams for reporting) is higher layer configured.
Proposal 2: Beam measurement quantities include RSRP.
Proposal 3: To enable multi-panel or multi-TRP beam measurement, the UE can be configured with more than one set of K beams, where UE reports the measurement results of N selected beams from each set.

R1-1702077 Discussion on beam reporting CATT

Proposal 1: The number of selected beams N can be configured by TRP or determined by UE.

Proposal 2: Measurement quantities for beam reporting is configurable between RSRP, CSI, and both RSRP and CSI.

Proposal 3: CSI-RS resource IDs are reported to indicate selected beams.

Proposal 4: Beam grouping based TX beam selection is supported to guarantee independence of selected TX beams.

UE is required to select TX beams from different beam groups.

Proposal 5: Beam grouping is carried out at TRP, and the grouping information is signaled to UE together with the RS setting for beam management.

R1-1703523 WF on Framework of Beam Management Huawei, HiSilicon, LG Electronics

Agreements:

A UE can be configured with the following high layer parameters for beam management:

N≥1 reporting settings, M≥1 resource settings

The links between reporting settings and resource settings are configured in the agreed CSI measurement setting CSI-RS based P-1 & P-2 are supported with resource and reporting settings P-3 can be supported with or without reporting setting A reporting setting at least including Information indicating selected beam(s)

L1 measurement reporting

FFS details (e.g., based on RSRP or CSI, etc.)

Time-domain behavior: e.g. aperiodic, periodic, semi-persistent

Frequency-granularity if multiple frequency granularities are supported

A resource setting at least including

Time-domain behavior: e.g. aperiodic, periodic, semi-persistent

RS type: NZP CSI-RS at least

At least one CSI-RS resource set, with each CSI-RS resource set having K≥1 CSI-RS resources FFS whether or not support >1 CSI-RS resource set per resource setting Some parameters of K CSI-RS resources can be the same, e.g. port number, time-domain behavior, density and periodicity if any Further discussion offline whether or not the mechanism for CSI acquisition framework can be applicable R1-1703525 Way Forward on Beam Reporting for NR MIMO ZTE, ZTE Microelectronics, Ericsson, Intel, Mediatek, Nokia, ASB Agreement:

Confirm the working assumption on group based beam reporting made in RAN1 Jan. NR Adhoc Meeting, with the following update:

Further discussion for possible down-selection or merging, especially taking into account overhead Agreements:

NR supports the following beam reporting considering L groups where L>=1 and each group refers to a Rx beam set (Alt1) or a UE antenna group (Alt2) depending on which alternative is adopted.

For each group I, UE reports at least the following information:

Information indicating group at least for some cases

FFS: condition(s) to omit this parameter e.g. when L=1 or $N_I$=1

Measurement quantities for $N_1$ beam (s)

Support L1 RSRP and CSI report (when CSI-RS is for CSI acquisition)

FFS: the details of RSRP/CSI derivation and content

FFS: Other reporting contents, e.g., RSRQ

FFS: Configurability between L1 RSRP and CSI report

FFS: whether or not to support differential L1 RSRP feedback

FFS: How to select $N_I$ beam(s) e.g max $N_I$ beams in terms of received power being above a certain threshold or in terms of correlation less than a certain threshold Information indicating $N_i$ DL Tx beam(s) when applicable FFS: the details on this information, e.g., CSI-RS resource IDs, antenna port index, a combination of antenna port index and a time index, sequence index, beam selection rules for assisting rank selection for MIMO tx, etc.

This group based beam reporting is configurable per UE basis.

This group based beam reporting can be turned off per UE basis e.g. when L=1 or $N_I$=1

NOTE: No group identifier is reported when it is turned off

FFS: how L is determined. e.g. by network configuration or UE selection or UE capability e.g. how many beams can be received simultaneously FFS: how is configured using the CSI framework to support multi-panel or multi-TRP transmission R1-1704102 Way Forward on RS association for UL and DL beam management ZTE, ZTE Microelectronics, ASTRI, CMCC, Ericsson, Intel Corporation (revision of R1-1703526)

Agreement:

FFS whether or not to support at least the following association of channel properties between UL and DL antenna ports at the same node for the case with and without beam correspondence UL SRS/DM-RS/RACH and DL CSI-RS/DM-RS/SS Details of beam related indication signaling (if any)

R1-1703730 WF on multi-beam based PUCCH transmission LG Electronics, InterDigital Agreement:

Study further multi-beam based NR-PUCCH transmission for robustness against beam pair link blocking E.g., UE transmits NR-PUCCH on different UL Tx beams in different NR-PUCCH OFDM symbols FFS: multi-beam triggering condition/mechanism (e.g. event-triggered, network configured, etc.)

FFS: number of OFDM symbols for each beam

R1-1703958 WF on beam indication Samsung, KT Corp., NTT DOCOMO, Verizon, Intel, CATT, Ericsson, Huawei, HiSilicon Agreements:

For reception of unicast DL data channel, support indication of spatial QCL assumption between DL RS antenna port(s) and DMRS antenna port(s) of DL data channel: Information indicating the RS antenna port(s) is indicated via DCI (downlink grants)

The information indicates the RS antenna port(s) which is QCL-ed with DMRS antenna port(s)

FFS: Indication details
E.g. explicit indication of RS port/resource ID, or implicitly derived
FFS when the indication is applied (e.g., the indication is assumed only for the scheduled PDSCH or until next indication; when the above information is included, if there should be a scheduling/beam switch offset, etc.)
FFS: Beam indication for receiving fall back unicast PDSCH (if supported)
Note: related signalling is UE-specific
FFS: Beam indication (if needed) for receiving (UE-group) common PDSCH for RRC connected UE
Candidate signalling methods for beam indication for a NR-PDCCH (i.e. configuration method to monitor NR-PDCCH)
MAC CE signalling
RRC signalling
DCI signalling
Spec-transparent and/or implicit method
Combination of the above
R1-1703558 RS for beam management Samsung, MediaTek, KT Corp., Nokia, ASB, Verizon
Agreement: For the signal(s) utilized for beam management (BM) for P1/P2/P3, study further whether it is UE-specific vs. non-UE-specific
Mechanism to Recover from Beam Failure
R1-1701716 Discussion on link recovery procedure for beam blockage Huawei, HiSilicon
Proposal 1: Beam failure is defined in L1/L2 and it occurs when the quality of one or more beam pair link(s) currently-in-use is below a certain threshold, FFS the definition of the threshold in L1/L2.
Proposal 2: Support at least the following scenarios for beam failure
Both DL and UL have failed
Only downlink has failed
Only uplink has failed
Proposal 3: Support NW-triggered mechanism to recover from beam failure.
Proposal 4: Support beam pair link selection based on high/low correlation with a reference beam pair link.
Proposal 5: Support reporting of correlation between candidate beam pair links and a reference beam pair link.
Proposal 6: Support configuring and monitoring of dedicated RACH and SRS resource/sequence to enable mechanisms to recover from beam failure.
R1-1702799 Views on mechanism to recover from beam failureNTT DOCOMO, INC.
Proposal 1: Comparison of SS-block RSRPs between the active beam set and non-active beam sets is used for triggering UL signal transmissions to recover from beam failure.
Proposal 2: UE reuses an association between one or multiple occasions for DL broadcast channel/signal and a subset of RACH resources which association is informed by broadcast system information. Based on the DL measurement, e.g., SS-block RSRPs, and the corresponding association, UE selects the subset of RACH resources associated with the best SS-block RSRP, and sends PRACH preambles to indicate beam failure.
Proposal 3: NR further considers that UE sends scheduling request or UL grant-free PUSCH to indicate beam failure. Association between one or multiple occasions for DL broadcast channel/signal and the UL signals is informed to UE by RRC signaling.
Proposal 4: After UE sends beam failure reporting, UE should, for NR-PDCCH reception, use the UE Rx beam that is used to measure the best SS-block RSRP and DM-RS ports used to receive the NR-PDCCH carrying RAR.
Proposal 5: NR shall support DMRS based semi-open loop transmission. UE and TRP switch to semi-open-loop transmission schemes as a fallback scheme when triggered.
R1-1703555 Signaling for recovery from beam failure Qualcomm, Ericsson
R1-1703988 WF on Mechanism to Recover from Beam Failure Huawei, HiSilicon, LG Electronics, MediaTek, AT&T, Samsung, vivo
Also supported by CATT, Ericsson
Agreements:
Beam failure event occurs when the quality of beam pair link(s) of an associated control channel falls low enough (e.g. comparison with a threshold, time-out of an associated timer). Mechanism to recover from beam failure is triggered when beam failure occurs
Note: here the beam pair link is used for convenience, and may or may not be used in specification
FFS: whether quality can additionally include quality of beam pair link(s) associated with NR-PDSCH
FFS: when multiple Y beam pair links are configured, X ($<=$Y) out of Y beam pair links falls below certain threshold fulfilling beam failure condition may declare beam failure
FFS: search space (UE-specific vs. common) of the associated NR-PDCCH
FFS: signaling mechanisms for NR-PDCCH in the case of UE is configured to monitor multiple beam pair links for NR-PDCCH
Exact definition of such threshold is FFS and other conditions for triggering such mechanism are not precluded
The following signals can be configured for detecting beam failure by UE and for identifying new potential beams by UE
FFS the signals, e.g., RS for beam management, RS for fine timing/frequency tracking, SS blocks, DM-RS of PDCCH (including group common PDCCH and/or UE specific PDCCH), DMRS for PDSCH
If beam failure event occurs and there are no new potential beams to the serving cell, FFS whether or not the UE provides an indication to L3.
Note: the criterion for declaring radio link failure is for RAN2 to decide.
FFS: The necessity of such indication
NR supports configuring resources for sending request for recovery purposes in symbols containing RACH and/or
FFS scheduling request or in other indicated symbols
R1-1703571 WF on UL signal for link failure recovery request LG Electronics, Huawei, HiSilicon, MediaTek, Samsung, Nokia
Agreements:
The following mechanisms should be supported in NR:
The UL transmission to report beam failure can be located in the same time instance as PRACH:
Resources orthogonal to PRACH resources
FFS orthogonal in frequency and/or sequences (not intended to impact PRACH design)
FFS channels/signals The UL transmission to report beam failure can be located at a time instance (configurable for a UE) different from PRACH
  Consider the impact of RACH periodicity in configuring the UL signal to report beam failure located in slots outside PRACH
  FFS the signal/channel for the UL transmission
Additional mechanisms using other channels/signals are not precluded (e.g., SR,
UL grant free PUSCH, UL control)
Beam Management for UL
R1-1702326 On UL beam management for NR InterDigital Communications
  Proposal 1: More than one signal type should be used for UL beam management and the signal type should be configurable for a certain UL beam management procedure based on UE status.
  Proposal 2: Support beam correspondence status indication as part of UE capability. Study the necessity of temporary beam correspondence status update.
R1-1703133 Joint DL/UL beam management operation for NR Sony
  Proposal 1: The joint DL/UL beam management operation under channel reciprocity environment should be supported to reduce DL signaling overhead.
  Proposal 2: NR should support efficient UL RS resource allocation method for the TRP side coordinated UL RS reception.
R1-1703687 WF for UL beam management Huawei, HiSilicon, Intel, MediaTek, InterDigital
R1-1704090 WF for UL beam management Huawei, HiSilicon, Intel, MediaTek, InterDigital, Xinwei, NTT DOCOMO, Samsung, LG Electronics
R1-1703999 SRS configuration CATT, Nokia
R1-1703729 WF on SRS transmission for UL beam managementLG Electronics, CATT
R1-1703754 WF on UE behavior on multi-port SRS transmission LG Electronics, Nokia, Alcatel-Lucent Shanghai Bell, ZTE, ZTE Microelectronics
  Agreement: Study further UE behavior(s) for SRS transmission and the details of the indication from gNB (if any)
Final Report of 3GPP TSG RAN WG1 #88bis v1.0.0 (Spokane, USA, 3-7 Apr. 2017) states:
Beam Management
R1-1704402 Summary of email discussion [88-15] Evaluation on beam management ZTE, ZTE Microelectronics
Beam Management Details
R1-1704229 DL beam management Huawei, HiSilicon
R1-1705342 DL beam management details Samsung
R1-1705891 DL beam management details Ericsson
R1-1704455 Discussion on UL beam management and imperfect beam correspondence MediaTek Inc.
R1-1705581 Beam management for NR Qualcomm Incorporated
R1-1706457 WF on beam measurement RS Samsung
Agreements:
For UE RRC connected mode, periodic signal is supported at least for P1 procedure (Tx/Rx beam alignment) using following options in addition to UE-specifically configured CSI-RS. Down selection from following options will be conducted in the next meeting.
  Opt. 1: SS blocks
  Opt. 2: Cell-specifically configured CSI-RS
    Configuration of CSI-RS is obtained from the broadcast message (e.g., MIB, SIB)
  Opt. 3: No additional option R1-1706596 Summary of views on beam management Qualcomm Inc.
R1-1706840 WF on use of SS blocks in beam management Qualcomm, LG, AT&T, Ericsson, Xinwei, Oppo
R1-1706733 WF on use of SS blocks in beam management Qualcomm, LG, AT&T, Ericsson, Xinwei, Oppo, IITH, CEWiT, Tejas Networks, IITM, ZTE
Agreements:
Study whether or not support mechanism for UE to provide L1/L2 reports based on SS-block measurements for beam management
  FFS which channels/signals in SS-block for measurement
  Especially in light of L3-RSRP
  Study further whether or not to have a unified format for L1-RSRP measurement report of SS-block and CSI-RS
R1-1706641 WF on BPL definition Nokia, Ericsson, ASB
R1-1706540 WF on Beam-Related Indication Ericsson, Intel, ZTE
Agreements:
Aim for low-overhead indication for spatial QCL assumption to assist UE-side beamforming/receiving
  FFS details (e.g., tag-based where the tag refers to previous CSI-RS resources, BPL-based, referring to previous measurement reports, indication one resource (set) out of multiple resource (set)s configured by RRC, CSI-RS resource/port index based, etc.)
R1-1706735 Way Forward on RS association for UL and DL beam management ZTE, ZTE Microelectronics, ASTRI, CMCC, Intel Corporation, Xinwei, Ericsson, Samsung, MediaTek, KT Corp, Spreadtrum
R1-1706784 WF on UL Beam Management MediaTek, Huawei, HiSilicon, InterDigital, ZTE, ZTE Microelectronics, Xinwei, Samsung, Sony, OPPO, China Telecom, Intel, Mitsubishi Electric, Ericsson, NEC, Deutsche Telekom, Fujitsu, ITRI, NTT DOCOMO, China Unicom, LG Electronics, SoftBank, KRRI
Agreements:
Confirm the WA from RAN1 AH1701 with the following update:
  NR supports at least one NW-controlled mechanism for beam management for UL transmission(s)
  FFS the details
R1-1706796 WF on Beam Management for UL Transmission MediaTek, Huawei, HiSilicon, InterDigital, ZTE, ZTE Microelectronics, Xinwei, Samsung, Intel, Sony, OPPO, ITRI, KRRI
Agreements:
Study whether or not the UE to provide information to gNB to assist UL beam management without UE beam correspondence
  E.g., the amount of SRS resources that is needed to train UE Tx beams, based on
DL beam management results if available
Study whether and how UE to use same transmission power for SRS transmission during one round of beam sweeping
  E.g., derived from beam-specific power control signalling and maximum transmit power
  FFS: spec. impact
R1-1706455 WF on UL Tx beam indication for UL beam management LGE, CATT, Samsung
R1-1706454 WF on multi-beam based PUCCH transmission LG Electronics, WILUS Inc., KT Corp.

R1-1706459 WF on beam reporting ZTE, ZTE Microelectronics, ASTRI

R1-1706660 WF on beam reporting CATT, Intel

Agreements:

For beam reporting, companies are encouraged to perform detailed analysis w.r.t. comparing Alt 1 and Alt 2, particularly considering the overhead (feedback overhead, signaling overhead, etc.), performance, flexibility in operation, etc.

Aim to down-select one of the two alternative s with the possibility of merging into a single alternative (if so, the corresponding analysis) at next meeting Each company to state the assumed UE implementation in the analysis R1-1704551 Details of downlink beam management CATT Mechanism to Recover from Beam Failure R1-1705343 Discussion on recovery from beam failure Samsung R1-1705951 Beam blockage detection and recovery for NR MIMO ASTRI, TCL Communication Ltd.

R1-1705961 Beam Recovery in NR Nokia, Alcatel-Lucent Shanghai Bell

R1-1706633 WF on Beam Failure Recovery MediaTek, Ericsson, Samsung, KT Corp, InterDigital Also supported by Nokia, ASB Agreements:

UE Beam failure recovery mechanism includes the following aspects
  Beam failure detection
  New candidate beam identification
  Beam failure recovery request transmission
  UE monitors gNB response for beam failure recovery request Beam failure detection
  UE monitors beam failure detection RS to assess if a beam failure trigger condition has been met
  Beam failure detection RS at least includes periodic CSI-RS for beam management
    SS-block within the serving cell can be considered, if SS-block is also used in beam management as well
  FFS: Trigger condition for declaring beam failure New candidate beam identification
  UE monitors beam identification RS to find a new candidate beam
  Beam identification RS includes
    Periodic CSI-RS for beam management, if it is configured by NW
    Periodic CSI-RS and SS-blocks within the serving cell, if SS-block is also used in beam management as well Beam failure recovery request transmission
  Information carried by beam failure recovery request includes at least one followings
    Explicit/implicit information about identifying UE and new gNB TX beam information
    Explicit/implicit information about identifying UE and whether or not new candidate beam exists
  FFS:
    Information indicating UE beam failure
    Additional information, e.g., new beam quality
  Down-selection between the following options for beam failure recovery request transmission
    PRACH
    PUCCH
    PRACH-like (e.g.,different parameter for preamble sequence from PRACH)
  Beam failure recovery request resource/signal may be additionally used for scheduling request UE monitors a control channel search space to receive gNB response for beam failure recovery request
  FFS: the control channel search space can be same or different from the current control channel search space associated with serving BPLs
  FFS: UE further reaction if gNB does not receive beam failure recovery request transmission Conclusion:

Note: Necessity of SS block and DMRS will be discussed simultaneously later

R1-1706453 WF on beam recovery mechanisms LG Electronics, Ericsson, Intel, KT Corp., Nokia, MediaTek Agreements:

Study how to support at least one mechanism when NW receive the beam failure recovery request
  E.g., NW assigns UL grant for beam reporting, NW transmits DL RS for beam measurement, NW signal beam indication or confirmation to UE, etc.
  E.g., UE assistance on NW decision of which mechanism to apply
  Whether or not a specific mechanism has specification impact R1-1706681 WF on Recovery from beam failure Samsung, MediaTek, Ericsson, NTT DOCOMO Agreement: FFS for the situation of "no new candidate beam", whether or not there are issues, and if so, whether or not RLF procedure can sufficiently handle the issues R1-1706827 WF on DL beam indication ZTE, ZTE Microelectronics Agreements:

For reception of DL data channel, study further at least the following:
  Whether or not have an effective window of spatial QCL assumption
  Interaction between higher layer signaling (if supported) and DCI indication
    FFS the signaling details for higher layer and DCI based approaches (e.g., the corresponding information field in DCI, etc.)
  Interaction between beam management and PDSCH transmission
    Whether or not to have a default behavior (e.g., due to DCI miss detection), and if so the default behavior
  Beam switching time, DCI decoding time, etc.

Draft Report of 3GPP TSG RAN WG1 #89 v0.1.0 (Hangzhou, China, 15-19 May 2017) states:
  Beam Management
  Beam Management Details
  R1-1708666 On RAN2 LS on CSI-RS for beam management and RRM measurements Ericsson
  R1-1709014 [DRAFT] Response LS on CSI-RS for beam management and RRM measurements ZTE
  R1-1709496 Potential agreements on beam management Qualcomm Agreements:

Support spatial QCL assumption between antenna port(s) within a CSI-RS resource(s) and antenna port of an SS Block (or SS block time index) of a cell
  The other QCL parameters not precluded
  FFS: indication either explicit or implicit or configurable or a default
  Note: default assumption may be no QCL Configuration of QCL for UE specific NR-PDCCH is by RRC and MAC-CE signalling Note that MAC-CE is not always needed FFS: necessity of DCI signalling Note: For example, DL RS QCLed with DMRS of PDCCH for delay spread, Doppler spread, Doppler shift, and average delay parameters, spatial parameters Agreement: Cell-specifically configured CSI-RS is not supported for beam management Friday session R1-1709774 Potential agreements on beam management Qualcomm Agreements:

The following beam grouping criteria are considered:
- A1 (based on Alt 1): Different TRP TX beams reported for the same group can be received simultaneously at the UE.
- A2 (based on Alt 2): Different TRP TX beams reported for different groups can be received simultaneously at the UE.

Down selection of the beam grouping criteria by next meeting

FFS in addition to the above grouping criteria, the following grouping criteria can be considered
- C1 (in combination with A1): Different TRP TX beams reported for different groups cannot be received simultaneously at the UE.
- C2 (in combination with A2): Different TRP TX beams reported for the same group cannot be received simultaneously at the UE.

Agreements:

For beam management with beam group reporting the following quantities should be considered
- the max number of groups supported in the specification M,
- the max number of Tx beams per group supported in the specification N
- the number of groups to report L
- the number of Tx beams per group in the report Q
- FFS: UE-specific configuration of the parameters L, Q incorporating UE-capability information L=1, Q=1 are supported which implies no impact to reporting and indication overhead Companies are encouraged to evaluate performance to determine values of M, N, L, Q for the first release of NR
- Decide on the values of L, M, N, Q supported by the spec to be able to determine impact on reporting and indication overhead R1-1709617 WF on CSI-RS design for beam management Samsung, Intel, KT, Ericsson R1-1709797 WF on CSI-RS pattern for beam management Huawei, HiSilicon, CATT, ZTE, OPPO R1-1709668 WF on CSI-RS for beam management ZTE, LG Electronics, ASTRI, Huawei, HiSi, Samsung, Ericsson, InterDigital, CATT Also supported by Nokia, Intel, Qualcomm Agreements:

NR supports CSI-RS configuration to support Tx and/or Rx beam sweeping for beam management conveying at least the following information Information related to CSI-RS resource configuration
E.g., CSI-RS RE pattern, number of CSI-RS antenna ports, CSI-RS periodicity (if applicable) etc.

Information related to number of CSI-RS resources

Information related to number of time-domain repetitions (if any) associated with each CSI-RS resource FFS: details of time-domain repetitions, e.g., signaling for time-domain repetitions may not be explicit FFS signaling details, e.g., explicit indication vs implicit indication Note this does not imply particular option (IFDMA or subcarrier scaling or DFT based) for sub time unit partition FFS: whether different sub-time units have same or different ports R1-1709554 WF on aperiodic SRS for UL beam management OPPO, Xinwei, Xiaomi, Coolpad, Spreadtrum, Nokia, ASB, CATT, China Telecom, Intel, Samsung, MediaTek, CATR, NTT DoCoMo, Ericsson, Huawei, HiSilicon Agreements:

For aperiodic SRS transmission triggered by single aperiodic SRS triggering field, the UE can be configured to transmit N(N>1) SRS resources for UL beam management FFS transmit power for the N SRS resources for UL beam management R1-1709808 WF on using SS block for beam management ZTE R1-1709773 WF on UL Beam Management Huawei, HiSilicon, Intel, Xinwei, MediaTek, InterDigital R1-1709483 WF on beam switching CATT Mechanism to Recover from Beam Failure R1-1709606 Summary from offline for beam recovery mechanism MediaTek Working Assumption:

Support at least the following triggering condition(s) for beam failure recovery request transmission:
- Condition 1: when beam failure is detected and candidate beam is identified at least for the case when only CSI-RS is used for new candidate beam identification
- FFS Condition 2: Beam failure is detected alone at least for the case of no reciprocity
  - FFS how the recovery request is transmitted without knowledge of candidate beam
- Note: if both conditions are supported, which triggering condition to use by UE also depends on both gNB configuration and UE capability R1-1709309 WF on beam recovery ZTE, MediaTek, vivo, Spreadtrum, Qualcomm, ASTRI, AT&T, OPPO, Ericsson, LGE, Xinwei Conclusion:

FS SS-block in addition to CSI-RS is at least supported for P-1 in beam management FFS with or without L1-RSRP reporting Agreements:

Support the following channel(s) for beam failure recovery request transmission:
- Non-contention based channel based on PRACH, which uses a resource orthogonal to resources of other PRACH transmissions, at least for the FDM case
  - FFS other ways of achieving orthogonality, e.g., CDM/TDM with other PRACH resources
  - FFS whether or not have different sequence and/or format than those of PRACH for other purposes
  - Note: this does not prevent PRACH design optimization attempt for beam failure recovery request transmission from other agenda item FFS: Retransmission behavior on this PRACH resource is similar to regular RACH procedure Support using PUCCH for beam failure recovery request transmission FFS whether PUCCH is with beam sweeping or not Note: this may or may not impact PUCCH design FFS Contention-based PRACH resources as supplement to contention-free beam failure recovery resources From traditional RACH resource pool 4-step RACH procedure is used Note: contention-based PRACH resources is used e.g., if a new candidate beam does not have resources for contention-free PRACH-like transmission FFS whether a UE is semi-statically configured to use one of them or both, if both, whether or not support dynamic selection of one of the channel(s) by a UE if the UE is configured with both R1-1709639 WF on handling beam failure recovery for unexpected cases vivo, Qualcomm, KT Corp, Ericsson Agreements:

To receive gNB response for beam failure recovery request, a UE monitors NR PDCCH with the assumption that the corresponding PDCCH DM-RS is spatial QCL'ed with RS of the UE-identified candidate beam(s)

FFS whether the candidate beam(s) is identified from a preconfigured set or not

Detection of a gNB's response for beam failure recovery request during a time window is supported FFS the time window is configured or pre-determined FFS the number of monitoring occasions within the time window FFS the size/location of the time window If there is no response detected within the window, the UE may perform re-tx of the request FFS details If not detected after a certain number of transmission(s), UE notifies higher layer entities FFS the number of transmission(s) or possibly further in combination with or solely determined by a timer Final Report of 3GPP TSG RAN WG1 #AH1_NR v1.0.0 (Spokane, USA, 16-20 Jan. 2017) states:

Beam Management and CSI Acquisition

R1-1700748 On robust beam management Ericsson

Observation 1: Using multiple beam-pair links can improve the robustness in beam-based systems Observation 2: There is a need to handle BPL failure in a quick and efficient way to maintain high and reliable performance for the users.

Proposal 1: An active beam pair link is supported for which the UE is monitoring PDCCH Proposal 2: One or more monitored beam-pair links is supported to improve the robustness and to discover new links Proposal 3: Support configurable PDCCH reception on monitored BPLs as a mean for increase robustness against BPL blocking.

R1-1700803 Beam recovery procedures Qualcomm Incorporated

Proposal 1: NR supports scheduling request and beam recovery request region in RACH slot in multi-beam scenario.

Proposal 2: NR supports higher number of cyclic shifts in each SR/beam recovery request subcarrier region compared to the number of cyclic shifts in RACH subcarrier region. NR decides this number based on the duration of SR/beam recovery request preamble and expected delay spread of the cell.

Proposal 3: NR supports gNB allotting dedicated SR or beam recovery request resources to UEs.

Proposal 4: NR shall support beam recovery request and scheduling request when gNB and UE are UL synchronized and gNB and UE are UL out-of-sync.

Proposal 5: NR shall support beam recovery request and scheduling request through the beam recovery request and scheduling request regions when gNB and UEs are UL synchronized.

Proposal 6: If beam correspondence is available at gNB, NR supports UE mapping a good DL SYNC resource to the symbol index of scheduling request or beam recovery request in RACH slot.

Proposal 7: If beam correspondence is not available at gNB, NR supports UE conveying its best DL TX beam ID through a combination of the selected subcarrier region and the cyclic shift of scheduling request/beam recovery request preamble.

Proposal 8: NR shall support beam recovery request and scheduling request using contention-based RACH when gNB and UE are UL out-of-sync.

R1-1701481 WF on Beam Recovery in multi-beam NR systems Qualcomm, Nokia, ASB, Xinwei, Intel, Interdigital Also supported by LG, Ericsson, OPPO Agreements:

NR supports that UE can trigger mechanism to recover from beam failure

Network explicitly configures to UE with resources for UL transmission of signals for recovery purpose Support configurations of resources where the base station is listening from all or partial directions, e.g., random access region FFS: Triggering condition of recovery signal (FFS new or existing signals) associated UE behavior of monitoring RS/control channel/data channel Support transmission of DL signal for allowing the UE to monitor the beams for identifying new potential beams FFS: Transmission of a beam swept control channel is not precluded This mechanism(s) should consider tradeoff between performance and DL signaling overhead Agreements (further to offline):

NR-PDCCH transmission supports robustness against beam pair link blocking

UE can be configured to monitor NR-PDCCH on M beam pair links simultaneously, where M≥1. Maximum value of M may depend at least on UE capability.

FFS: UE may choose at least one beam out of M for NR-PDCCH reception

UE can be configured to monitor NR-PDCCH on different beam pair link(s) in different NR-PDCCH OFDM symbols FFS: NR-PDCCH on one beam pair link is monitored with shorter duty cycle than other beam pair link(s).

FFS: time granularity of configuration, e.g. slot level configuration, symbol level configuration FFS: Note that this configuration applies to scenario where UE may not have multiple RF chains FFS: The definition of monitoring NR-PDCCH on beam pair link(s).
Parameters related to UE Rx beam setting for monitoring NR-PDCCH on multiple beam pair links are configured by higher layer signaling or MAC CE and/or considered in the search space design
FFS: Required parameters
FFS: Need to support both higher layer signaling and MAC CE R1-1701321 WF on beam reporting Samsung, KT
Decision: The document is noted, modified as follows:
Agreements:
UE measurement based on RS for beam management (at least CSI-RS) composed of K (=total number of configured beams) beams and reporting measurement results of N selected beams:
N is not necessarily fixed number
FFS: whether/how to configure and/or indicate the values of N
Note: The above procedure based on RS for mobility purpose is not precluded.
Reporting information at least include
Measurement quantities for N beam (s)
FFS: Detailed reporting contents, e.g., CSI, RSRP or both
FFS: How to select N beam(s)
FFS: how to identify the subset
Information indicating N DL Tx beam(s), if N<K
FFS: the details on this information, e.g., CSI-RS resource IDs, antenna port index, a combination of antenna port index and a time index, sequence index, etc.

R1-1701299 WF on unified framework for beam management and CSI acquisition LG Electronics, AT&T, CATT, Ericsson, NTT DOCOMO
NR supports the previously agreed CSI framework for the purposes of both CSI acquisition and beam management.
Possible Agreements:
NR supports the previously agreed CSI framework including RS, measurement, reporting settings for the purposes of both CSI acquisition and beam management
FFS on necessary different aspects for beam management R1-1701480 WF on DL beam management framework LG Electronics, AT&T, CATT, Ericsson, NTT DOCOMO
Possible Agreements:
DL beam management is at least supported by the agreed framework (i.e., N≥1 Reporting settings, M≥1 Resource settings, and 1 Measurement setting, where the Measurement setting includes L≥1 links)
Reporting setting supports beam reporting for DL beam management, including at least: Configuration for reporting CSI-RS resource selection and quality-related metric
Details FFS
P-1 and P-2 can be supported with configuring Reporting/Resource/Measurement settings.
P-3 can be supported at least with configuring Resource setting.
FFS on RSs used for resource setting R1-1701546 WF on framework for DL beam mangement LG Electronics, Ericsson, NTT DOCOMO
Strive for applying agreed CSI framework (i.e., resource, measurement, and reporting settings) for the purpose of DL beam management.

FFS: Whether or not any setting(s) need to be designed separately.
FFS: Content of each setting
FFS: Configuration of each setting
FFS: Link between settings
Note: It does not imply same setting has to be configured for CSI acquisition and beam management.
Note: Introduction of new setting(s) is not precluded.
Note: P-1 and P-2 can be supported with configuring reporting, resource, and measurement settings.
Note: P-3 can be supported at least with configuring resource setting.

R1-1701313 WF on Periodic/Semi-Persistent/Aperiodic CSI Reporting NTT DOCOMO, Intel, LGE, Mitsubishi, Sharp, Softbank
Also supported by InterDigital.
Agreements:
For periodic CSI-RS,
Semi-persistent CSI reporting is activated/deactivated by MAC CE and/or DCI
Aperiodic CSI reporting is triggered by DCI
FFS: Necessity of additional signaling with MAC CE
For semi-persistent CSI-RS,
Periodic CSI reporting is not supported.
Semi-persistent CSI reporting is activated/deactivated by MAC CE and/or DCI
Semi-persistent CSI-RS is activated/deactivated by MAC CE and/or DCI
FFS: Relationship of signaling between CSI reporting and CSI-RS transmission
Aperiodic CSI reporting is triggered by DCI
Semi-persistent CSI-RS is activated/deactivated by MAC CE and/or DCI
FFS: Necessity of additional signaling with MAC CE
For aperiodic CSI-RS,
Periodic [and semi-persistent] CSI reporting is not supported
Aperiodic CSI reporting is triggered by DCI
Aperiodic CSI-RS is triggered by DCI and/or MAC CE
FFS: Relationship of signaling between CSI reporting and CSI-RS transmission, e.g., common DCI signaling between CSI reporting and CSI-RS transmission
FFS: Necessity of additional signaling with MAC CE
Note that further down selection can be done later between MAC CE and DCI in above bullets
Note that it is possible to dynamically trigger RS and reports through links in the measurement setting R1-1701356 WF on timings for aperiodic CSI-RS and aperiodic CSI reporting LG Electronics, Samsung, Ericsson, ZTE, ZTE Microelectronics
Agreements:
NR supports mechanism(s) to trigger aperiodic CSI-RS and aperiodic CSI reporting simultaneously.
FFS: signaling details (e.g. single DCI or separate DCI)
FFS: method(s) for interference measurement
FFS: reference resource of aperiodic CSI reporting
For aperiodic CSI-RS timing offset X, support X=0 at least, if aperiodic CSI-RS triggering is done by DCI
FFS: supporting other values of X Note: 'aperiodic CSI-RS timing offset X' refers to the time gap between aperiodic CSI-RS triggering and aperiodic CSI-RS transmission w.r.t. number of slots.

For CSI reporting timing offset Y that is fixed or configurable by the network but with certain restriction on lower limit of Y to provide sufficient CSI computation time.

Candidate values of Y are fixed or pre-determined by certain rule(s).

Rule is FFS (e.g. number of CSI measurement/RS/reporting settings, CSI feedback type, number of ports, nearest CSI-RS transmission timing, UE capability, etc.)

Note: 'aperiodic CSI reporting timing offset Y' refers to the time gap between aperiodic CSI reporting triggering and aperiodic CSI reporting w.r.t. number of slots.

FFS Y is fixed or configurable

FFS configuration is done by DCI and/or MAC CE and/or higher layer signaling

R1-1701317 WF on UL Beam Management MediaTek, LG, InterDigital, vivo, Xinwei, ZTE, ZTE Microelectronics, Intel, ITRI, Huawei, HiSilicon, CMCC, OPPO, Ericsson, DOCOMO NR supports NW-controlled UL beam management procedure(s)

Details of UL beam management procedure(s) are FFS and study should include at least Signal(s) for UL beam management procedure(s)
E.g., SRS, PRACH preamble, UL DMRS
Additional contents can also be included, e.g., beam reporting Method(s) and content for TRP to indicate selected UE Tx beam and configure UE sweeping Impact of beam correspondence Status
E.g., When to use UL beam management mechanism(s)
E.g., Procedures such as U-1, U-2, U-3, and beam correspondence based procedure UE capability reporting
E.g., capability of analog beamforming Consider the cases when UL and DL are from the same TRP and from different TRPs Discussion: Also supported by Samsung.

Working Assumption:

NR supports at least one NW-controlled mechanism for beam management for UL transmission(s)

Details are FFS, including at least the following study:
Signal(s) for the mechanism(s) if necessary
E.g., SRS, PRACH preamble, UL DMRS
Additional contents can also be included, e.g., beam reporting Method(s) and content for TRP to indicate selected UE Tx beam and configure UE sweeping Impact of beam correspondence Status
E.g., When to use the mechanism(s)
E.g., Procedures such as U-1, U-2, U-3, and beam correspondence based procedure UE capability reporting
E.g., capability of analog beamforming Consider the cases when UL and DL are from the same TRP and from different TRPs Conditions when the mechanism is particularly useful R1-1701351 WF on beam correspondence NTT DOCOMO, Samsung, Mitsubishi Electric, MediaTek, Sharp, OPPO, MTI Agreement:
For the definition of beam correspondence:
Confirm the previous working assumption of the definition
Note: this definition/terminology is for convenience of discussion The detailed performance conditions are up to RAN4

Agreement:
Support capability indication of UE beam correspondence related information to TRP
FFS details including capability definition, case(s) (if any) when the indication is not necessary R1-1701394 WF on SRS for UL beam management LG Electronics, Intel, MediaTek Agreements:
For NR UL, support transmissions of SRS precoded with same and different UE Tx beams within a time duration Detailed FFS, including the resulting overhead, time duration (e.g., one slot), and configuration, e.g., in the following:
Different UE Tx beam: FFS per SRS resource and/or per SRS port
Same UE Tx beam across ports: for a given SRS resource and/or a set of SRS resources
FFS: The SRS resources can be mapped in TDM/FDM/CDM manner.
FFS: overhead reduction schemes such as IFDMA or larger subcarrier spacing
FFS gNB can indicate selected SRS port/resource for UE after receiving the SRS.

R1-1701286 WF on CRI reporting Samsung, CATT, Ericsson, DOCOMO

Agreements:
When a UE is configured with K>1 NZP CSI-RS resources, a UE can report a set of N UE-selected CSI-RS-resource-related indices
FFS: The name of the corresponding CSI reporting parameter
FFS: Maximum value of N (support of N=1 only is not precluded)
FFS: What other CSI parameter(s) are reported together with the CSI-RS-resource-related indices, if any, and joint reporting mechanism (in case of multiple reporting parameters)
FFS: Extension of this feature to other types of Resources R1-1701503 Way Forward on Beam Reporting for NR MIMO ZTE, ZTE Microelectronics, Ericsson, Intel, MediaTek, Nokia, ASB, Samsung Working assupmtions:
Support at least one of these two alternatives of beam reporting:
Alt 1: UE reports information about TRP Tx Beam(s) that can be received using selected UE Rx beam set(s).
where a Rx beam set refers to a set of UE Rx beams that are used for receiving a DL signal
Note: It is UE implementation issues on how to construct the Rx beam set.
One example: each of Rx beam in a UE Rx beam set corresponds to a selected Rx beam in each panel.

For UEs with more than one UE Rx beam sets, the UE can report TRP Tx Beam(s) and an identifier of the associated UE Rx beam set per reported TX beam NOTE: Different TRP Tx beams reported for the same Rx beam set can be received simultaneously at the UE.

NOTE: Different TRP TX beams reported for different UE Rx beam set may not be possible to be received simultaneously at the UE Alt 2: UE reports information about TRP Tx Beam(s) per UE antenna group basis where UE antenna group refers to receive UE antenna panel or subarray For UEs with more than one UE antenna group, the UE can report TRP Tx Beam(s) and an identifier of the associated UE antenna group per reported TX beam NOTE: Different TX beams reported for different antenna groups can be received simultaneously at the UE.

NOTE: Different TX beams reported for the same UE antenna group may not be possible to be received simultaneously at the UE FFS: How UE antenna group or Rx beam set is captured in the specification R1-1701506 WF on beam indication Samsung, Ericsson, KT Corp., Verizon, NTT DOCOMO, AT&T, LGE Agreements:

For reception of DL control channel, support indication of spatial QCL assumption between an DL RS antenna port(s), and DL RS antenna port(s) for demodulation of DL control channel FFS: signaling method Note: Indication may not be needed for some cases:

For reception of DL data channel, support indication of spatial QCL assumption between DL RS antenna port(s) and DMRS antenna port(s) of DL data channel FFS: which DL RS(s) to use for this purpose Different set of DMRS antenna port(s) for the DL data channel can be indicated as QCL with different set of RS antenna port(s)

Option 1: Information indicating the RS antenna port(s) is indicated via DCI

FFS: whether the information indicating the RS antenna port(s) will be assumed only for the scheduled "PDSCH" or until the next indication Option 2: Information indicating the RS antenna port(s) is indicated via MAC-CE, and will be assumed until the next indication Option 3: Information indicating the RS antenna port(s) is indicated via a combination of MAC CE and DCI At least one option is supported FFS: whether to support either or both options FFS: whether the information indicating the RS antenna port(s) for DMRS ports for DL control channel also applies to DMRS ports for DL data channel Note: Indication may not be needed for some cases:

R1-1701504 WF on beam management for DL control channel and data channel ZTE, ZTE Microelectronics, ASTRI, Intel R1-1701514 Way Forward on Evaluation for Beam Management ZTE, ZTE Microelectronics, Ericsson, Nokia, ASB Final Report of 3GPP TSG RAN WG1 #86 v1.0.0 (Gothenburg, Sweden, 22-26 Aug. 2016) states:

Multi-Antenna Scheme for New Radio Interface

R1-167291 Digital subsystem with hybrid beamforming Nokia, Alcatel-Lucent Shanghai Bell, Verizon Wireless Observation 1: Operating using hybrid transceiver architecture suffers from increased scheduling latency and system overhead compared to digital architectures. Especially UL control signaling is expensive with hybrid architecture.

Observation 2: Widening the RX beams for UL control may be used in some situations but would be far from optimal solution.

Observation 3: Full digital subsystem could be implemented in cost efficient manner along with hybrid architecture.

Observation 4: Full digital subsystem has high potential to improve hybrid architecture operation significantly.

Proposal 1: Define UL control signal and channel and RS structures in a way to allow optimizing BS hybrid implementation with full digital RX subsystem:

narrowband resource allocation structures with flexible allocation and scheduling possibility signal design to enable high multiplexing capability for the control signals like scheduling request R1-166089 Beam Management Procedure for NR MIMO Huawei, HiSilicon Proposal 1: The following beam refinement procedures should be studied in NR, including reliability performance, overhead and so on.

DL or UL based joint TRP and UE beam refinement

DL or UL based UE beam refinement only

DL or UL based TRP beam refinement only

Proposal 2: Beam probing for best beam(s) and angle estimation should be considered in NR.

Proposal 3: A mechanism and signaling for fast link recovery among TRPs should be supported in NR.

Proposal 4: Control beam(s) derived from the data beam(s) and using the refinement beams for control signal transmission should be considered in NR Proposal 5: Beam management procedures taking LF assisted control signalling transmission for HF should be taken into considerations in the overall beam management.

R1-167466 Key principles for beam management Ericsson

Beam management is handled by L1/L2 procedures

Strive to handle beam management within the CSI framework in NR (i.e. the framework used for link adaptation of data transmission).

In the beam management procedures, one or multiple beam pair links (BPLs) are monitored by the network using uplink measurements by the TRPs and/or downlink measurements from the UE Support a sweep of BMRS in different TRP beams to allow for a measurement per TRP beam in the UE.

Consider supporting a repetition of BMRS in the same TRP beam to allow for measurement of the TRP beam in different UE receive beams.

R1-167951 WF on digital sub-system with hybrid beamforming Nokia, ASB

Support enhancing hybrid architecture operation using digital RX subsystem consisting of the same (or similar) amount of RxRUs as the number of antenna elements.

UL Signal design and UL control channel design needs to follow the following principles:

Transmission bandwidth of the UL control signal and associated demodulation UL RS is significantly smaller than the system bandwidth, e.g. 10/20 MHz bandwidth.

UL Signal design to enable high multiplexing capability for the UL control signals like scheduling request.

Efficient joint operation of hybrid RX and digital RX, e.g. efficient utilization of UL data and UL control channels.

Discussion: Interference between narrowband and wideband should also be listed

R1-167950 WF on beam management Intel Corporation, Ericsson

Distinguish two beam related procedures:
  Procedure A is used to support beam based mobility
    Main purpose is to discover TRP TX beams and perform mobility related measurements
    UE RX beam training support may also be considered
    Searching and discovering TRP TX beams from neighbor TRPs which are non-synchronized is supported
      Note: TRPs may still be synchronized but the UE shall not make such assumption
    L3 reporting
  Procedure B is used to support beam management
    Purpose is to track TRP TX beams and support UE to select UE RX beams
    RS (beams) to measure on are explicitly configured to the UE
      Note: No search/discovery procedure is involved
    L1/L2 reporting Discussion: Samsung asked for more time, not a simple change.

R1-167961 WF on aperiodic beam sweeping and CSI reportingZTE

Study the following aspects of aperiodic beam sweeping:
  Three types of beam sweeping for both UL and DL:
    TRP beam sweeping only, keeping a fixed UE beam
      supporting measuring multiple TRP beams by the same UE beam
    UE beam sweeping only, keeping a fixed TRP beam
      supporting measuring the same TRP beam with multiple UE beams
      E.g. by time domain replica waveform. TRP Tx using the same TRP beam and UE receives using one UE beam per replica
      E.g. by multiple wider sub-carrier spacing based OFDM symbols. TRP Tx using the same TRP beam and UE receives each symbol with different UE beam
    Joint TRP and UE beam sweeping
  Indication of TX and/or RX beam on control/feedback signaling:
    Indication is per beam or per beam group
  Content of aperiodic CSI report e.g. RSRP, RI/PMI/CQI, beam ID
  NOTE: support various mobility scenarios
  Others are not precluded
  Study aperiodic CSI in conjunction with aperiodic RS transmission:
    Dynamic indication of aperiodic reference signal and interference measurement resource including
      Aperiodic reference signal for channel measurement for CSI feedback and beam selection/training
      Aperiodic interference measurement resource for interference measurement, including using non-zero power reference signal
      Resource pool sharing for aperiodic channel and interference measurement resources
    DMRS based CSI feedback including CQI adjustment and beam refinement
    Study the timing requirement among aperiodic CSI triggering, aperiodic RS transmission and CSI feedback.
      Timing between CSI triggering and aperiodic RS transmission X
      Timing between aperiodic RS transmission and CSI/beam feedback Y
  Others are not precluded R1-167947 WF on Beam Management Huawei, HiSilicon, Potevio Study on the following aspects for beam management
TRP(s) used to transmit beam management RS is transparent to UE
Beam management procedure based on L1 and L2 procedure
Beam management procedure based on LF assisted HF
Beam management includes the following two stages:
  Coarse beam alignment, i.e., periodic beam sweeping without prior acquired beam(s) information
  Fine beam alignment, i.e., periodic/aperiodic beam sweeping with prior acquired beam(s) information
    Strive to handle this procedure within a unified CSI framework in NR
  Fast link recovery procedure due to UE movement/rotation/blockage
    E.g., Monitoring multiple beam pairs for link recovery
  Beam probing based beam refinement/tracking
    E.g., beam selection, or angle estimation
RS design principle of Beam Management
DL beam management can be based on DL DMRS in addition to DL RS dedicated to CSI acquisition and beam management
UL beam management can be based on SRS, UL DMRS and energy-efficient UE-specific tracking signals R1-167966 WF on Beam Management CATT, Samsung RAN1 should study beam management procedures under different channel reciprocity assumptions
  At a TRP or UE, with TX and RX channel reciprocity (e.g., beam reciprocity), TX beam (or RX beam) can be obtained from RX beam (or TX beam) to reduce overhead and latency
  Without TX and RX channel reciprocity, beam management procedure may require TX and RX beam sweeping in both DL and UL links
RAN1 should study different methods of determining a beam pair for communication, e.g.,
  Joint determination: Tx beam and Rx beam of the beam pair are determined jointly
  Separate determination: Tx beam or Rx beam of the beam pair are determined sequentially
Study beam management procedure with and without explicit indication of beam(s) used for data/control channel or reference signal transmission
Possible Agreements:
The following two DL beam management procedures are supported:
  Procedure A for initial beam acquisition without prior acquired beam(s) information (can be called as beam acquisition)

TRP TX beam and UE RX beam sweeping are supported

[Procedure A can be considered for mobility]

Procedure B for beam change with prior acquired beam(s) information (can be called beam adjustment)

B-1: to support inter/intra-TRP Tx beam change [within multiple TRPs] for the same UE Rx beam B-2: to support UE Rx beam change for the same TRP Tx beam Strive for the same procedure design for intra-TRP and inter-TRP beam management Note: UE may not know the TRP has changed for inter-TRP Tx beam change Note: Procedures B-1&B-2 can be performed jointly Note: Procedures B-1&B-2 can be performed multiple times to achieve e.g. TRP Tx/UE Rx beam change simultaneously

[Procedure B can be considered for mobility]

Support managing multiple Tx/Rx beam pairs for a UE for fast link recovery

Assistant information from another carrier (e.g., LF carrier) can be utilized in procedures A&B E.g., low frequency carrier is used to feedback the measurement for high frequency

[Procedure A can be used for beam maintenance]

R1-168278 WF on DL beam management Intel Corporation, Huawei, HiSilicon, Ericsson, Nokia, Alcatel-Lucent Shanghai Bell, Verizon, MTK, LGE, NTT DoCoMo, Xinwei Agreements:

The following DL L1/L2 beam management procedures are supported within one or multiple TRPs:

P-1: is used to enable UE measurement on different TRP Tx beams to support selection of TRP Tx beams/UE Rx beam(s)

For beamforming at TRP, it typically includes a intra/inter-TRP Tx beam sweep from a set of different beams For beamforming at UE, it typically includes a UE Rx beam sweep from a set of different beams FFS: TRP Tx beam and UE Rx beam can be determined jointly or sequentially P-2: is used to enable UE measurement on different TRP Tx beams to possibly change inter/intra-TRP Tx beam(s)

From a possibly smaller set of beams for beam refinement than in P-1

Note: P-2 can be a special case of P-1

P-3: is used to enable UE measurement on the same TRP Tx beam to change UE Rx beam in the case UE uses beamforming Strive for the same procedure design for Intra-TRP and inter-TRP beam management Note: UE may not know whether it is intra-TRP or inter TRP beam Note: Procedures P-2&P-3 can be performed jointly and/or multiple times to achieve e.g. TRP Tx/UE Rx beam change simultaneously Note: Procedures P-3 may or may not have physical layer procedure spec. impact Support managing multiple Tx/Rx beam pairs for a UE Note: Assistance information from another carrier can be studied in beam management procedures Note that above procedure can be applied to any frequency band Note that above procedure can be used in single/multiple beam(s) per TRP Note: multi/single beam based initial access and mobility treated within a separate RAN1 agenda item R1-168322 Definitions supporting beam related procedures Nokia, Qualcomm, CATT, Intel, NTT DoCoMo, Mediatek, Ericsson, ASB, Samsung, LG Beam management=a set of procedures to acquire and maintain a set of TRP(s) and/or UE beams that can be used for DL and UL transmission/reception, which include at least following aspects:

Beam selection=for TRP(s) or UE to select of its own beam(s).

Beam measurement=for TRP(s) or UE to measure characteristics of received beamformed signals Beam reporting=for UE to report a property/quality of beamformed signal(s) based on beam measurement Beam sweeping=operation of covering a spatial area, with beams transmitted and/or received during a time interval in a predetermined way.

Discussion: Ericsson→can a note be added that these are not related to mobility?

Decision: The document is noted and agreed in:

R1-168468 Definitions supporting beam related procedures Nokia, Qualcomm, CATT, Intel, NTT DoCoMo, Mediatek, Ericsson, ASB, Samsung, LGE R1-167965 WF on CSI measurement and reporting in NR Huawei, HiSilicon A unified CSI acquisition framework should be studied in NR, which shall support CSI measurement based on CSI-RS Beam measurement based on RS for beam management Implicit and explicit CSI feedback Reciprocity based CSI acquisition The implicit CSI feedback methods should be studied in NR Codebook design Interference measurement results obtained from

ZP CSI-RS

NZP CSI-RS

DMRS

Beam measurement results

The explicit CSI feedback methods should be studied in NR

Feedback of channel covariance matrix

E.g. based on Kronecker-product

Feedback of channel matrix or channel eigenvector

E.g. based on multi-beam combination

Both quantized and unquantized/analog feedback

Multi-level CSI measurement and reporting with the following features should be supported in NR Joint feedback of wideband/long-term and subband/short-term CSI Based on hybrid non-precoded and beamformed CSI-RS Joint feedback of explicit CSI and implicit CSI At least the following CSI measurement and reporting mechanisms should be studied by NR Aperiodic CSI measurement and reporting Semi-persistent CSI measurement and reporting Self-contained CSI triggering, measurement and reporting in a 'time interval X' should be studied in NR Note: here the definition of 'time interval X' follows the agreements in RAN1 #85 meeting R1-168179 WF on CSI measurement and reporting in NR Huawei, HiSilicon, Ericsson, China Telecom Decision: The document is noted and modified as follows:
Agreements:
A simplified CSI acquisition framework should be studied in NR, which could support
  CSI measurement based on CSI-RS (if supported)
  Implicit and explicit CSI feedback
  CSI acquisition based on different degree of reciprocity
  Other features to be supported
The implicit CSI feedback methods should be studied in NR
  Codebook design
  Interference measurement based on interference measurement resource which could be one or more of the following options
    ZP CSI-RS (if supported)
    NZP CSI-RS (if supported)
    DMRS (if supported)
    Other resources are not precluded
  CSI feedback based on DMRS (if supported)
The explicit CSI feedback methods should be studied in NR
  Feedback of channel covariance matrix
  Feedback of channel matrix
  Feedback of channel eigenvector
  Both quantized and unquantized/analog feedback
  Other methods are not precluded
CSI measurement and reporting with the following components should be studied in NR
  Wideband/long-term CSI
  Subband/short-term CSI
  Explicit CSI
  Implicit CSI
  Configuration of the above components individually or jointly is FFS
QCL
R1-167970 WF on the antenna ports QCL in NR Intel, LGE, Ericsson, Samsung, InterDigital, Huawei/HiSilicon
Agreements:
All physical channels and reference signals in NR are transmitted using antenna ports
Agree as working assumption the following antenna port definition for NR (same as in LTE)
  An antenna port is defined such that the channel over which a symbol on the antenna port is conveyed can be inferred from the channel over which another symbol on the same antenna port is conveyed.
Working assumption: Parameters for antenna port QCL in NR includes at least (if QCL is supported)
  Average gain, average delay, delay spread, Doppler shift and Doppler spread (same as in LTE)
  Additional parameters are FFS
FFS whether the QCL or other means can be used for UE beamforming management
The following QCL assumptions for DM-RS antenna ports in NR are for further study
  QCL across DM-RS antenna ports
    All the DMRS antenna ports are QCL-ed with each other
    Not all the DMRS antenna ports are QCL-ed with each other
  QCL across scheduled PRBs for DM-RS antenna port
  QCL among DM-RS antenna port groups
  QCL of DM-RS antenna ports with antenna ports of other reference signals (RS to be defined in NR)
  Other assumptions are not precluded
Note: The antenna ports of demodulation reference signal (DM-RS) in NR are used to transmit at least physical data and, possibly, control channels and used at the UE for demodulation.
R1-168272 WF on QCL assumptions in NR Huawei, HiSilicon, China Telecom, DoCoMo, CATR, Intel
R1-168360 WF on QCL assumptions & configurations in NR Huawei, HiSilicon, China Telecom, DoCoMo, CATR, Intel
R1-168436 WF on QCL assumptions & configurations in NR Huawei, HiSilicon, China Telecom, DoCoMo, CATR, Intel
Agreements:
All QCL assumptions that a UE is allowed to make among antenna ports should be identified and explicitly specified
QCL is defined as follows:
  Two antenna ports are said to be quasi co-located if properties of the channel over which a symbol on one antenna port is conveyed can be inferred from the channel over which a symbol on the other antenna port is conveyed.
  Future refinement on QCL definition is not precluded
R1-168388 WF on beam management CATT, Samsung, National Instruments, ZTE
Agreements:
Consider different channel reciprocity assumptions in beam management procedures
  At a TRP or UE, with TX and RX channel reciprocity (full or partial) (e.g., beam reciprocity), TX beam (or RX beam) can be obtained from RX beam (or TX beam) to reduce overhead and latency
  Without TX and RX channel reciprocity, beam management procedure may require TX and RX beam sweeping in both DL and UL links
RAN1 study different methods of determining Tx and Rx beam(s) for communication on one link direction (uplink or downlink), e.g.,
  Joint determination: Tx beam and Rx beam are determined jointly
  Separate determination: Tx beam or Rx beam are determined sequentially.
  Multi-stage determination: for instance, coarse Tx-Rx beam determination followed by fine Tx-Rx beam determination
Study beam management procedure with and without explicit signaling of beam(s) or beam group(s) used for transmission
Aperiodic CSI
R1-168386 WF on aperiodic CSI reporting ZTE Corporation, ZTE Microelectronics, ASTRI, Intel Corporation, Samsung, CATT
Agreements:
Study aperiodic CSI reporting in conjunction with aperiodic RS transmission:
  Dynamic indication of aperiodic RS and interference measurement resource including
    Aperiodic RS for channel measurement for CSI reporting
    Aperiodic interference measurement resource for interference measurement, including using non-zero/zero power RS, demodulation RS;
    Resource pool sharing for aperiodic channel and interference measurement resources
  Study the timing requirement among aperiodic RS triggering, CSI reporting triggering, aperiodic RS transmission, and CSI reporting.

Timing between CSI triggering and aperiodic RS transmission X

Timing between aperiodic RS transmission and CSI reporting Y

Notes: Consider the single triggering for RS transmission and CSI reporting;

Others are not precluded

Note: aperiodic triggering doesn't preclude on-demand (using activate/release mechanism) triggering Periodic CSI R1-168186 WF on periodic and semi-persistent CSI for NR Samsung, Ericsson, Qualcomm Agreements:

Support at least one of the following schemes for CSI reporting:

Scheme 1: periodic CSI reporting analogous to LTE

Scheme 2: semi-persistent CSI reporting (e.g. activate/release mechanism analogous to LTE SPS)

Scheme 3: aperiodic CSI reporting

FFS: Possible signaling support

Strive to design NR periodic, semi-persistent, and/or aperiodic CSI reporting, considering at least following aspects UL coverage Required RS Reporting information type Forward compatibility Energy efficiency RS and CSI reporting overhead Study whether to avoid specifying dependency between CSI reports in different reporting instances Such dependencies, if any, can be different for periodic, semi-persistent, and/or aperiodic CSI reporting CSI Timing R1-168135 WF on CSI timing relationship LG, InterDigital, Intel, Huawei Agreements:

Study flexible timings of RS indication/transmission for CSI measurement, CSI feedback triggering/reporting. Following aspects should be considered at least for periodic CSI (where appropriate)/aperiodic/semi-persistent CSI reporting Linkage between each timing Details FFS. Some non-exhaustive exemplary timing relationships include:

Ex1) RS indication and CSI feedback triggering

Ex2) RS indication and RS transmission

Ex3) RS indication, RS transmission, CSI feedback triggering and CSI reporting in the same [SF]

Signaling method for timing, if needed (if so, details)

Feasible time gap between RS transmission and CSI reporting taking CSI computation delay/complexity, propagation delay, channel coherence time, and UL timing advance into account Signaling overhead needs to be taken into account Note: the timing above refers to layer 1 control signaling, higher-layer signaling or a combination thereof Note: RS indication can be RS triggering or RS activation/deactivation, and can include RS resource configuration.

Note: This doesn't preclude a fixed timing based RS transmission for CSI measurement, CSI feedback reporting.

UE Rotation

R1-168308 WF on support of rotatable UE with beamforming in NR LG, Intel, KT, MediaTek, InterDigital, Samsung Agreements:

Study impacts of UE movement, rotation and/or channel/beam blockage w.r.t. following aspects UE/TRP beam change CSI mismatch from CSI reporting instance to data transmission instance Study at least the following techniques under the consideration of UE movement, rotation and/or channel/beam blockage including Beam management of UE/TRP Tx/Rx beams Transmission/reception techniques to provide more robustness (e.g. semi-OL MIMO transmission, beam cycling, beam broadening)

R1-168389 WF on the design of downlink control channel ZTE Corporation, ZTE Microelectronics, Qualcomm, ASTRI, Intel Corporation Revision of R1-168274

Agreements:

Study the relationship of beam(s) used for L1 control channel and beam(s) used for data channel E.g. Using different beamwidth for data and control E.g. Using different beam directions for data and control E.g. At least one beam is shared by data and control E.g., same beam for data and control R1-168318 Summary of Wednesday Offline Session on NR MIMO Samsung R1-168448 Summary of Thursday Offline Session on NR MIMO Samsung In general, LTE has been considered a successful way in wireless communication in recent years. With cellular traffic exploding, LTE implemented in unlicensed spectrum is seen as an attractive method by operators around the world. Hence, 3GPP has worked on licensed-assisted access (LAA), which means traffic can be offloaded via cells in unlicensed spectrum, assisted by cells in licensed spectrum. A workable procedure for LAA DL (Downlink) and UL (Uplink) is developed in LTE Release 13 and 14 respectively. In Release 15, some enhancements about LAA transmission are provided.

In NR, usage in unlicensed spectrum also appears attractive to communication operators due to wider bandwidth, especially in high frequency band. However, in high frequency band, the power loss due to signal penetration in high frequency band is significant, the beamforming technology in transmission and reception is essential. Until now, there are already some beam related procedures discussed in 3GPP NR work item, including beam recover, P1/P2/P3 beam management, U1/U2/U3 beam management, etc. These beam related procedures are currently established based on licensed spectrum scenario. For reduction on specification effort, these procedures may directly be used or modified in unlicensed spectrum scenario.

However, some procedures need to be modified to avoid some ambiguous conditions which may be faced by UE, for example, beam recovery procedure. From agreements set forth in the Final Report of 3GPP TSG RAN WG1 #88bis v1.0.0 (Spokane, USA, 3-7 Apr. 2017), beam recovery procedure generally includes four following aspects:

Beam failure detection,

New candidate beam identification,

Beam failure recovery request transmission,

UE monitors gNB response for beam failure recovery request.

The beam failure could be generally defined as: when the quality of beam pair link(s) of an associated control channel falls low enough (e.g. comparison with a threshold, time-out of an associated timer), as discussed in the Final Report of 3GPP TSG RAN WG1 #88 v1.0.0 (Athens, Greece, 13-17 Feb. 2017).

As a result, when a UE has difficulty in receiving control signal/channel or cannot receive control signal or channel, the UE would think beam failure occurs. Nonetheless, due to channel uncertainty in unlicensed spectrum, why UE does not receive control signal or channel does not absolutely result from beam failure. Instead, the reason can be that network is unable to occupy the channel and transmit downlink control signal. Similarly, the possibility of beam failure happening before an occupation time start also has an impact on UE knows if network occupied the channel since, in legacy, the UE realizes if network has occupied the channel by detecting if receiving downlink transmission from network (e.g. monitor control signal/channel, receive reference signal). Therefore, for NR in unlicensed spectrum, the UE cannot receive downlink transmission may result from beam failure or a busy channel. The ambiguous situation would make UE cannot distinguish beam failure or busy channel.

In general, there are several potential solutions to resolve this problem.

Solution 1—In general, one solution is assuring that beam pair link does not fail at least during most of the downlink occupation time. In other words, after network occupies the channel and starts to transmit downlink transmission, the beam pair link between network and UE is always valid during most of the downlink occupation time. To achieve this, a P1 beam management procedure can be implemented in the starting subframe to make sure the beam pairs with all UEs are valid. In this way, UE could monitor or receive downlink transmission from network and realize that the channel is occupied by network.

Network can start to implement beam sweeping in the starting subframe. In the beam sweeping procedure, network should transmit downlink transmission, which can be downlink signal, downlink data or downlink channel. For each transmission in the sweeping procedure, network can transmit one or multiple beam. UE also implements beam sweeping to receive the possible downlink signal, downlink data or downlink channel in the starting subframe with one or multiples beams at each sweep. Since UE does not know which subframe is starting subframe, UE needs to implement beam sweeping in each subframe after the last downlink occupation time ends or in each subframe during the time duration that no downlink occupation time has ever occurred. After UE finds the candidate beam, UE should indicate network the candidate beam. Hence, the steps could comprise:
1. UE performs receiving beam sweeping in each subframe after the last downlink occupation time ends or in each subframe during the time duration that no downlink occupation time has ever occurred.
2. Network implements transmitting beam sweeping in the starting subframe after network grabs the channel.
3. UE finds the candidate beam and indicate network the candidate beam.

So, in the beginning of downlink occupation time, the time duration composition would be:

1. a downlink part in order that network and UE both implement beam sweeping, where UE should find a candidate beam in this part;
2. a switch part for UE to do DL/UL switch; and
3. an uplink part for UE to indicate the candidate beam to network.

After these steps, the condition that UE cannot be aware of network has occupied the channel can be avoided since all beam pairs between network and UEs are guaranteed valid. Besides, a beam recovery procedure can be done at the same time beam failure condition is known to both network and UE, which lowers the latency.

Solution 2—In Solution 1, UE is required to implement receiving beam sweeping in each subframe after the last downlink occupation time ends or in each subframe during the time duration that no downlink occupation time has ever occurred. This method imposes a certain level of overhead on UE side since receiving beam sweeping is needed to perform to blind detect if there is downlink transmission from network or not.

Hence, in Solution 2, UE can implement receiving beam sweeping based on a time period, m. The time period value m can be indicated from network or UE derived it based on a specific rule or a mapping table. The time period value m can be chosen based on the value of maximum occupation time value or the average occupation time value under the current used DL LBT (Listen Before Talk) priority class. The DL LBT priority class value can be implicitly or explicitly signalled by network or derived by UE. For example, assume maximum occupation time value is 10 ms, then, the average occupation time value can be calculated as $\lceil(1+2+\ldots+10)/10\rceil=6$ ms. The period value can be chosen as half of value of average occupation time, such as 3 ms, or chosen by other mathematical calculation. If last downlink occupation time ends in subframe n, UE needs to performs receiving beam sweeping in subframe n+3, n+6, . . . , etc.

In this way, UE may not always implement the receiving beam sweeping procedure in the starting subframe during the downlink occupation time. Network should be able to derive a specific subframe, which is the first subframe when UE applies receiving beam sweeping based on the period m, during the downlink occupation time. Instead of performing a transmitting beam sweeping in the starting subframe of occupation time, network just performs transmitting beam sweeping in the specific subframe. So, in time intervals during the occupation time, whereas transmitting beam sweeping is not performed, network still schedules downlink data to UEs with the beam pairs used in the last transmission or the last occupation time.

Also, other than beam sweeping based on the period m, UE still detects if downlink transmission/downlink signal occurs using the receiving beam used in the last reception or the last occupation time, if exists, in subframes whereas beam sweeping is not performed. If the UE detects a downlink transmission or downlink signal from network, UE can skip the receiving beam sweeping procedure based on the period m during the downlink occupation time. For those UEs that do not detect a downlink transmission or downlink signal from network during the downlink occupation time, the receiving beam sweeping procedure based on the period m is needed to perform. After UE finds the candidate beam in the specific subframe, UE should indicate network the candidate beam. Hence, the steps could comprise:
1. UE performs receiving beam sweeping in subframes based on period m after the last downlink occupation time ends or in subframes based on period m during the time duration that no downlink occupation time has ever occurred.
2. UE still detects if downlink transmission or downlink signal occurs using the receiving beam used in the last downlink transmission occupation time, if exists.
3. Some UEs detect downlink transmission or downlink signal occurs in the beginning of downlink occupation time. Then, these UEs can skip the receiving beam sweeping procedure based on the period m during the downlink occupation time.
4. The other UEs, which do not detect downlink transmission or downlink signal occurs in the beginning of downlink occupation time, still implement the receiving beam sweeping procedure based on the period m during the downlink occupation time.
5. UEs find the candidate beam and indicate network the candidate beam.

So, in the specific subframe of downlink occupation time, the time duration composition would be
1. a downlink part in order that network and UE both implement beam sweeping, where UE should find a candidate beam in this part;
2. a switch part for UE to do DL/UL switch;
3. an UL part for UE to indicate the candidate beam to network.

Solution 3—Instead of network doing transmitting beam sweeping in the starting subframe or specific subframe, network can transmit a downlink transmission (e.g. downlink data, downlink signal, downlink channel) to all UEs in the starting subframe using the beams in the last reception or the last occupation time. This downlink transmission does not carry too much information and UE can decode it fast and transmit a response or acknowledgement signal in a short time. The downlink transmission can be cell-specific, beam specific or UE specific. The response or acknowledgement signal is UE-specific so network can realize which UE's beams are still valid by receiving the response/acknowledgement signal. This method lets network confirm which UE's beams are still valid. With such information, network can start to schedule those UEs whose beams are still valid and implement beam recovery related procedure to UEs whose beams are not valid, such as beam management procedure or beam recovery procedure. In this method, UE can implement receiving beam sweeping as follows:
1. in each subframe after the last downlink occupation time ends or in each subframe during the time duration that no downlink occupation time has ever occurred; or
2. in subframes based on period m after the last downlink occupation time ends or in subframes based on period m during the time duration that no downlink occupation time has ever occurred, where the description of m is the same in Solution 2.

One possibility is that UE does not implement receiving beam sweeping after the last downlink occupation time ends or during the time duration that no downlink occupation time has ever occurred.

In addition, one or more solutions discussed above could be combined.

Figure 6:
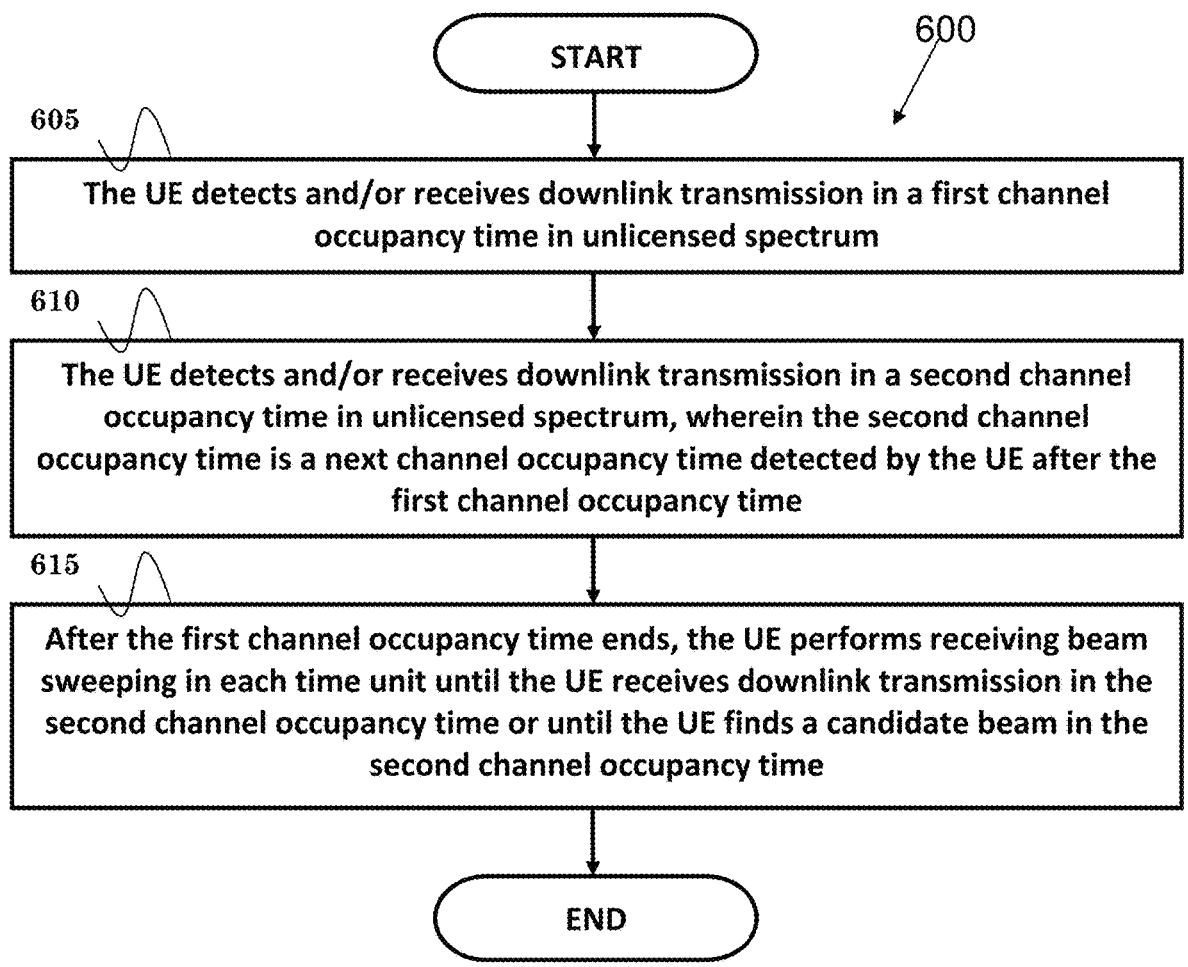
FIG. 6 is a flow chart according to one exemplary embodiment.

FIG. 6 is a flow chart 600 according to one exemplary embodiment of a UE. In step 605, the UE detects and/or receives downlink transmission in a first channel occupancy time in unlicensed spectrum. In step 610, the UE detects and/or receives downlink transmission in a second channel occupancy time in unlicensed spectrum, wherein the second channel occupancy time is a next channel occupancy time detected by the UE after the first channel occupancy time. In step 615, after the first channel occupancy time ends, the UE performs receiving beam sweeping in each time unit until the UE receives downlink transmission in the second channel occupancy time or until the UE finds a candidate beam in the second channel occupancy time.

In one embodiment, if the UE has not received downlink transmission in unlicensed spectrum, the UE could perform receiving beam sweeping in each time unit until the UE receives downlink transmission or until the UE finds a candidate beam. Each time unit could be a subframe or a slot. After the UE finds the candidate beam, the UE could indicate the candidate beam to a network.

Referring back to FIGS. 3 and 4, in one exemplary embodiment of a UE, the device 300 includes a program code 312 stored in the memory 310. The CPU 308 could execute program code 312 to enable the UE (i) to detect and/or receive downlink transmission in a first channel occupancy time in unlicensed spectrum, (ii) to detect and/or receive downlink transmission in a second channel occupancy time in unlicensed spectrum, wherein the second channel occupancy time is a next channel occupancy time detected by the UE after the first channel occupancy time, and (iii) to perform, after the first channel occupancy time ends, receiving beam sweeping in each time unit until the UE receives downlink transmission in the second channel occupancy time or until the UE finds a candidate beam in the second channel occupancy time. Furthermore, the CPU 308 can execute the program code 312 to perform all of the above-described actions and steps or others described herein.

Figure 7:
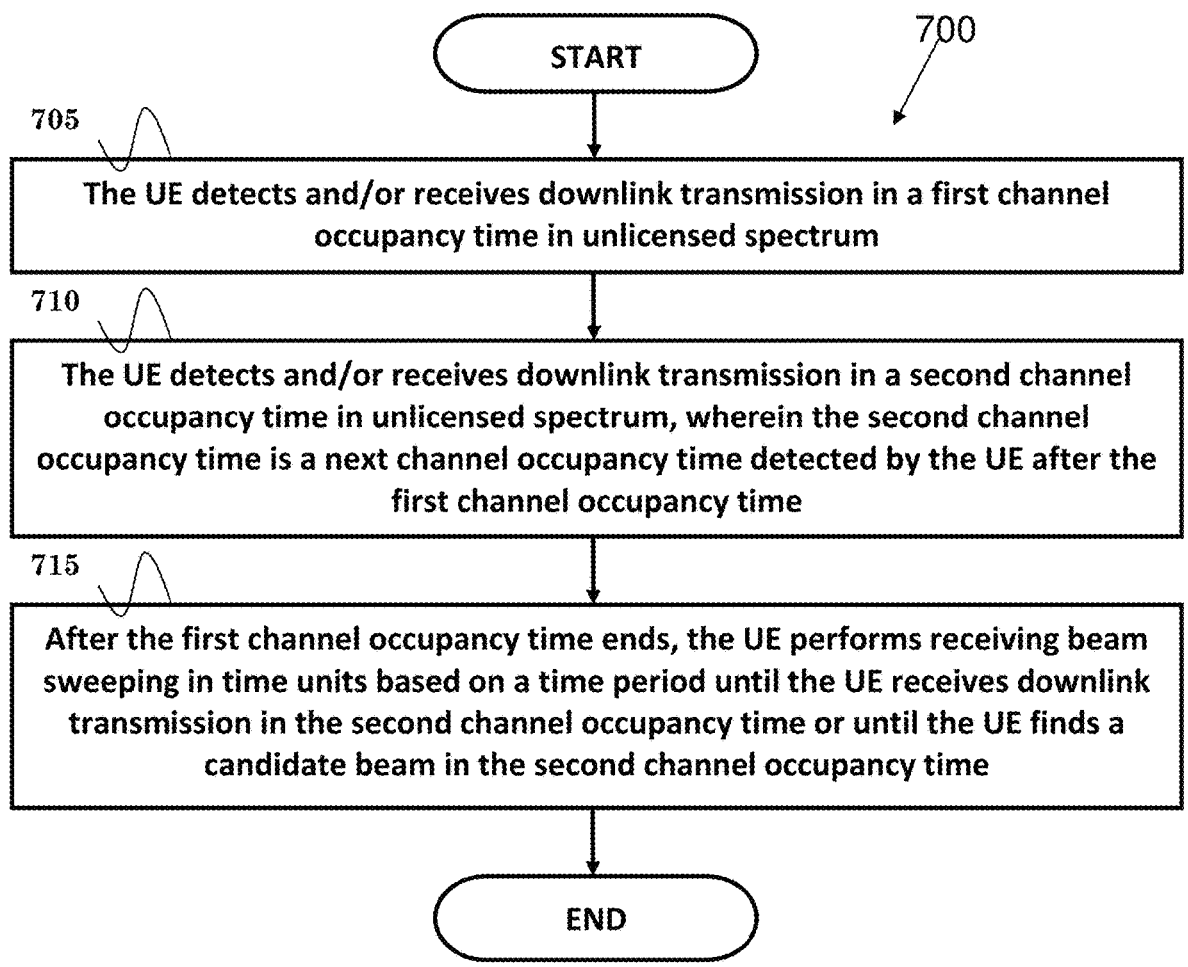
FIG. 7 is a flow chart according to one exemplary embodiment.

FIG. 7 is a flow chart 700 according to one exemplary embodiment of a UE. In step 705, the UE detects and/or receives downlink transmission in a first channel occupancy time in unlicensed spectrum. In step 710, the UE detects and/or receives downlink transmission in a second channel occupancy time in unlicensed spectrum, wherein the second channel occupancy time is a next channel occupancy time detected by the UE after the first channel occupancy time. In step 715, after the first channel occupancy time ends, the UE performs receiving beam sweeping in time units based on a time period until the UE receives downlink transmission in the second channel occupancy time or until the UE finds a candidate beam in the second channel occupancy time.

In one embodiment, if the UE has not received downlink transmission in unlicensed spectrum, the UE could perform receiving beam sweeping in time units based on a time period until the UE receives downlink transmission or until the UE finds a candidate beam. Each time unit could be a subframe or a slot.

In one embodiment, after the UE finds the candidate beam, the UE could indicate the candidate beam to a network. Furthermore, after the end of first channel occupancy time and before the end of the second channel occupancy time, the UE could detect and/or monitor downlink transmission via beam pairs which are used in the last reception or in the first channel occupancy time, unless beam pairs are updated, wherein the UE could detect and/or monitor downlink transmission in time units in which the UE does not perform the receiving beam sweeping. If the UE detects downlink transmission via beam pairs used in the last reception or in the first channel occupancy time, the UE could skip the receiving beam sweeping based on the time period in the remaining time units in the second channel occupancy time.

In one embodiment, the time period could be determined based on a specific rule or a mapping table. The time period could also be determined based on maximum or average occupation time value under the used LBT priority value. In addition, the time period could be derived by UE or indicated by network.

Referring back to FIGS. 3 and 4, in one exemplary embodiment of a UE, the device 300 includes a program code 312 stored in the memory 310. The CPU 308 could execute program code 312 to enable the UE (i) to detect and/or receive downlink transmission in a first channel occupancy time in unlicensed spectrum, (ii) to detect and/or receive downlink transmission in a second channel occupancy time in unlicensed spectrum, wherein the second channel occupancy time is a next channel occupancy time detected by the UE after the first channel occupancy time, and (iii) to perform, after the first channel occupancy time ends, receiving beam sweeping in time units based on a time period until the UE receives downlink transmission in the second channel occupancy time or until the UE finds a candidate beam in the second channel occupancy time. Furthermore, the CPU 308 can execute the program code 312 to perform all of the above-described actions and steps or others described herein.

Figure 8:
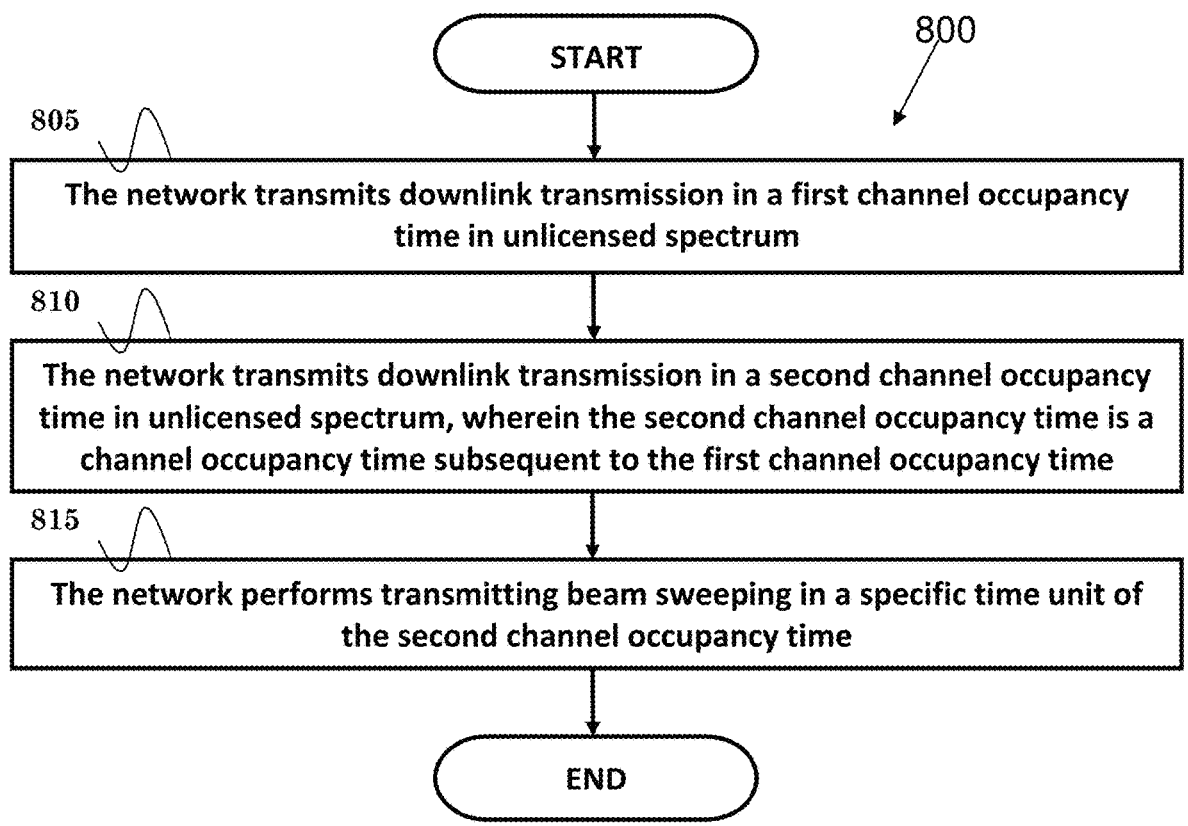
FIG. 8 is a flow chart according to one exemplary embodiment.

FIG. 8 is a flow chart 800 according to one exemplary embodiment of a network. In step 805, the network transmits downlink transmission in a first channel occupancy time in unlicensed spectrum. In step 810, the network transmits downlink transmission in a second channel occupancy time in unlicensed spectrum, wherein the second channel occupancy time is a channel occupancy time subsequent to the first channel occupancy time. In step 815, the network performs transmitting beam sweeping in a specific time unit of the second channel occupancy time.

In one embodiment, the network could perform transmitting beam sweeping with beams occupying the channel in the specific time unit of the second channel occupancy time. The specific time unit could be a starting time unit of the second channel occupancy time. Furthermore, the specific time unit could be a time unit based on a time period, wherein the time period is indicated or configured by the network for a UE to perform receiving beam sweeping after the first channel occupancy time.

In one embodiment, the network could transmit downlink transmission to the UE via beam pairs, used to serve the UE in the last transmission or in the first channel occupancy time, in time units other than the specific time unit, unless beam pairs are updated.

Referring back to FIGS. 3 and 4, in one exemplary embodiment of a network, the device 300 includes a program code 312 stored in the memory 310. The CPU 308 could execute program code 312 to enable the network (i) to transmit downlink transmission in a first channel occupancy time in unlicensed spectrum, (ii) to transmit downlink transmission in a second channel occupancy time in unlicensed spectrum, wherein the second channel occupancy time is a channel occupancy time subsequent to the first channel occupancy time, and (iii) to perform transmitting beam sweeping in a specific time unit of the second channel occupancy time. Furthermore, the CPU 308 can execute the program code 312 to perform all of the above-described actions and steps or others described herein.

Figure 9:
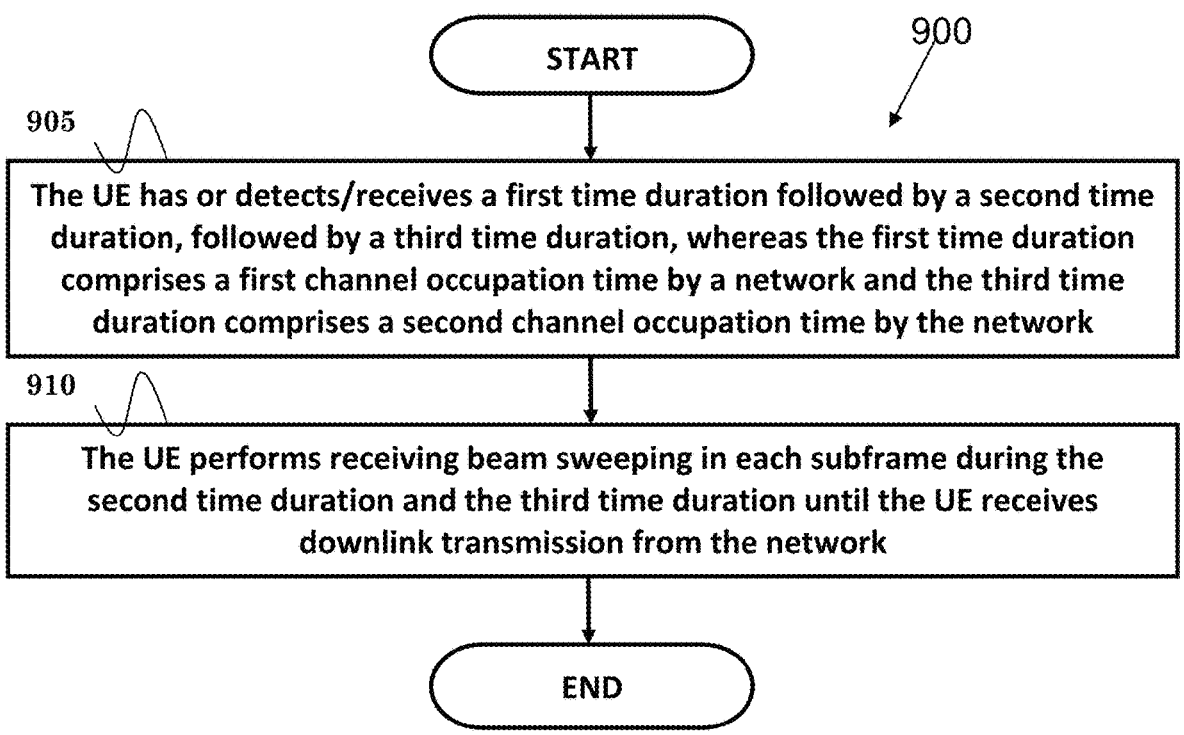
FIG. 9 is a flow chart according to one exemplary embodiment.

FIG. 9 is a flow chart 900 according to one exemplary embodiment of a UE. In step 905, the UE has or detects/receives a first time duration followed by a second time duration, followed by a third time duration, whereas the first time duration comprises a first channel occupation time by a network and the third time duration comprises a second channel occupation time by the network. In step 910, the UE performs receiving beam sweeping in each subframe during the second time duration and the third time duration until the UE receives downlink transmission from the network.

Referring back to FIGS. 3 and 4, in one exemplary embodiment of a UE, the device 300 includes a program code 312 stored in the memory 310. The CPU 308 could execute program code 312 to enable the UE (i) to have or detect/receive a first time duration followed by a second time duration, followed by a third time duration, whereas the first time duration comprises a first channel occupation time by a network and the third time duration comprises a second channel occupation time by the network, and (ii) to perform receiving beam sweeping in each subframe during the second time duration and the third time duration until the UE receives downlink transmission from the network. Furthermore, the CPU 308 can execute the program code 312 to perform all of the above-described actions and steps or others described herein.

Figure 10:
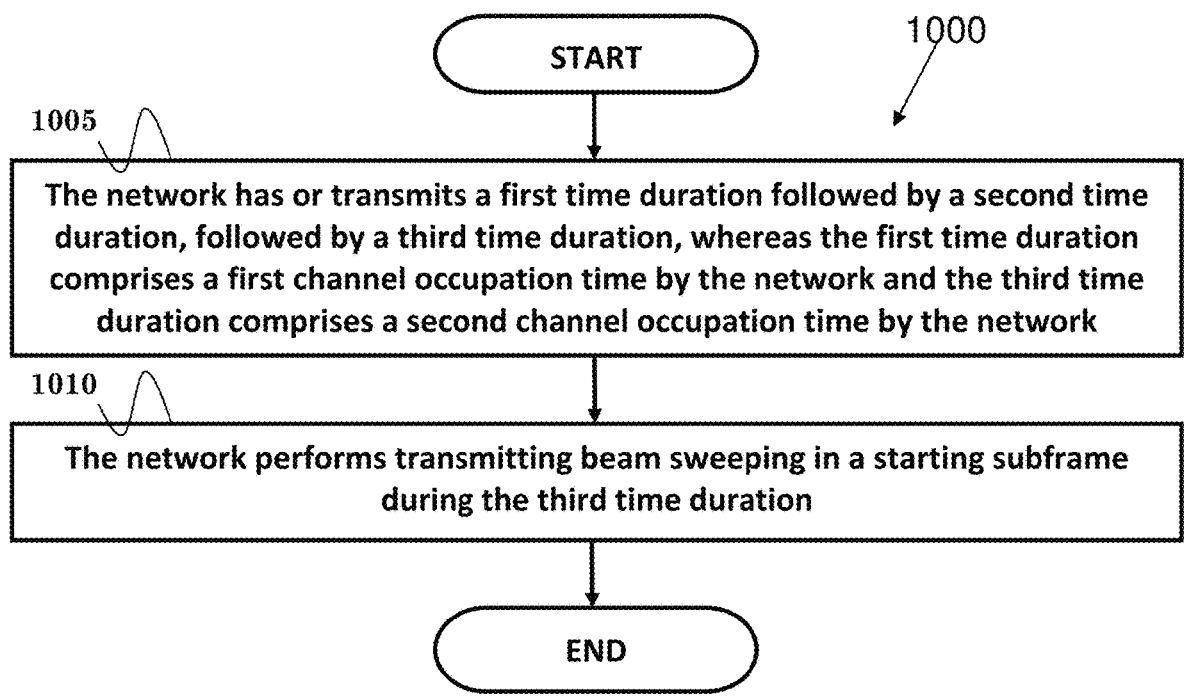
FIG. 10 is a flow chart according to one exemplary embodiment.

FIG. 10 is a flow chart 1000 according to one exemplary embodiment of a network. In step 1005, the network has or transmits a first time duration followed by a second time duration, followed by a third time duration, whereas the first time duration comprises a first channel occupation time by the network and the third time duration comprises a second channel occupation time by the network. In step 1010, the network performs transmitting beam sweeping in a starting subframe during the third time duration.

Referring back to FIGS. 3 and 4, in one exemplary embodiment of a network, the device 300 includes a program code 312 stored in the memory 310. The CPU 308 could execute program code 312 to enable the network (i) to have or transmit a first time duration followed by a second time duration, followed by a third time duration, whereas the first time duration comprises a first channel occupation time by the network and the third time duration comprises a second channel occupation time by the network, and (ii) to perform transmitting beam sweeping in a starting subframe during the third time duration. Furthermore, the CPU 308 can execute the program code 312 to perform all of the above-described actions and steps or others described herein.

In the context of the embodiments illustrated in FIGS. 9 and 10 and described above, the UE could perform receiving beam sweeping in each subframe during the second time duration and the third time duration until the UE finds a candidate beam. Alternatively, the UE could perform receiving beam sweeping in each time unit during the second time duration and the third time duration until the UE receives downlink transmission from network. The UE could also perform receiving beam sweeping in each time unit during the second time duration and the third time duration until the UE finds a candidate beam.

In one embodiment, the operating bands of the UE and the network could be located in unlicensed spectrum. The UE could perform the receiving beam sweeping by one or multiple beams at each sweep. The network could implement a transmitting beam sweeping with beams occupying the channel in the starting subframe during the third time duration. The network could also implement a transmitting beam sweeping with one beam or multiple beams at each sweep in the starting subframe during the third time duration.

In one embodiment, the UE could find a candidate beam from the receiving beam sweeping in the subframe whereas the network implements transmitting beam sweeping. Furthermore, the UE could indicate the candidate beam to the network during the third time duration.

Figure 11:
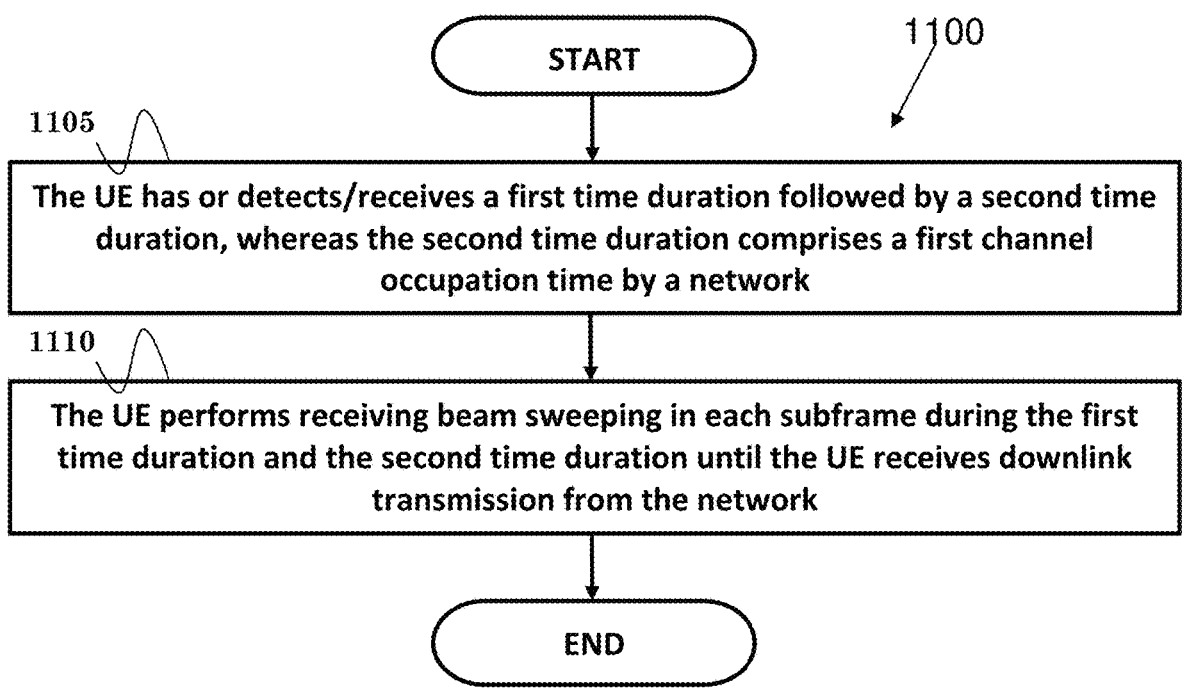
FIG. 11 is a flow chart according to one exemplary embodiment.

FIG. 11 is a flow chart 1100 according to one exemplary embodiment of a UE. In step 1105, the UE has or detects/receives a first time duration followed by a second time duration, whereas the second time duration comprises a first channel occupation time by a network. In step 1110, the UE performs receiving beam sweeping in each subframe during the first time duration and the second time duration until the UE receives downlink transmission from the network.

Referring back to FIGS. 3 and 4, in one exemplary embodiment of a UE, the device 300 includes a program code 312 stored in the memory 310. The CPU 308 could execute program code 312 to enable the UE (i) to have or detect/receive a first time duration followed by a second time duration, whereas the second time duration comprises a first channel occupation time by a network, and (ii) to perform receiving beam sweeping in each subframe during the first time duration and the second time duration until the UE receives downlink transmission from the network. Furthermore, the CPU 308 can execute the program code 312 to perform all of the above-described actions and steps or others described herein.

Figure 12:
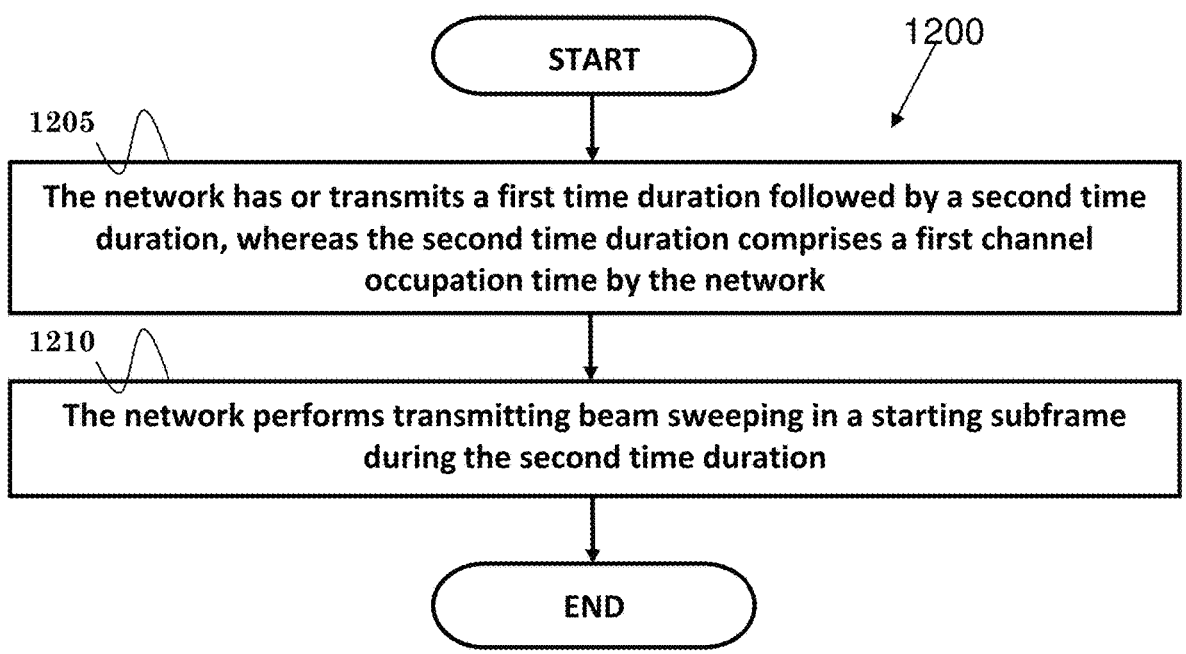
FIG. 12 is a flow chart according to one exemplary embodiment.

FIG. 12 is a flow chart 1200 according to one exemplary embodiment of a network. In step 1205, the network has or transmits a first time duration followed by a second time duration, whereas the second time duration comprises a first channel occupation time by the network. In step 1210, the network performs transmitting beam sweeping in a starting subframe during the second time duration.

Referring back to FIGS. 3 and 4, in one exemplary embodiment of a network, the device 300 includes a program code 312 stored in the memory 310. The CPU 308 could execute program code 312 to enable the network (i) to have or transmit a first time duration followed by a second time duration, whereas the second time duration comprises a first channel occupation time by the network, and (ii) to perform transmitting beam sweeping in a starting subframe during the second time duration. Furthermore, the CPU 308 can execute the program code 312 to perform all of the above-described actions and steps or others described herein.

In the context of the embodiments shown in FIGS. 11 and 12 and described above, the UE could perform receiving beam sweeping in each subframe during the first time duration and the second time duration until the UE finds a candidate beam. Alternatively, the UE could perform receiving beam sweeping in each time unit during the first time duration and the second time duration until the UE receives downlink transmission from a network. The UE could also perform receiving beam sweeping in each time unit during the first time duration and the second time duration until the UE finds a candidate beam.

In one embodiment, the operating bands of the UE and the network could be located in unlicensed spectrum. Furthermore, the UE could perform the receiving beam sweeping by one or multiple beams at each sweep.

In one embodiment, the network could implement a transmitting beam sweeping with beams occupying the channel in the starting subframe during the second time duration. The network could also implement a transmitting beam sweeping with one beam or multiple beams at each sweep in the starting subframe during the second time duration.

In one embodiment, the UE could find a candidate beam from the receiving beam sweeping in the subframe whereas the network implements transmitting beam sweeping. In addition, the UE could indicate the candidate beam to the network during the third time duration.

Figure 13:
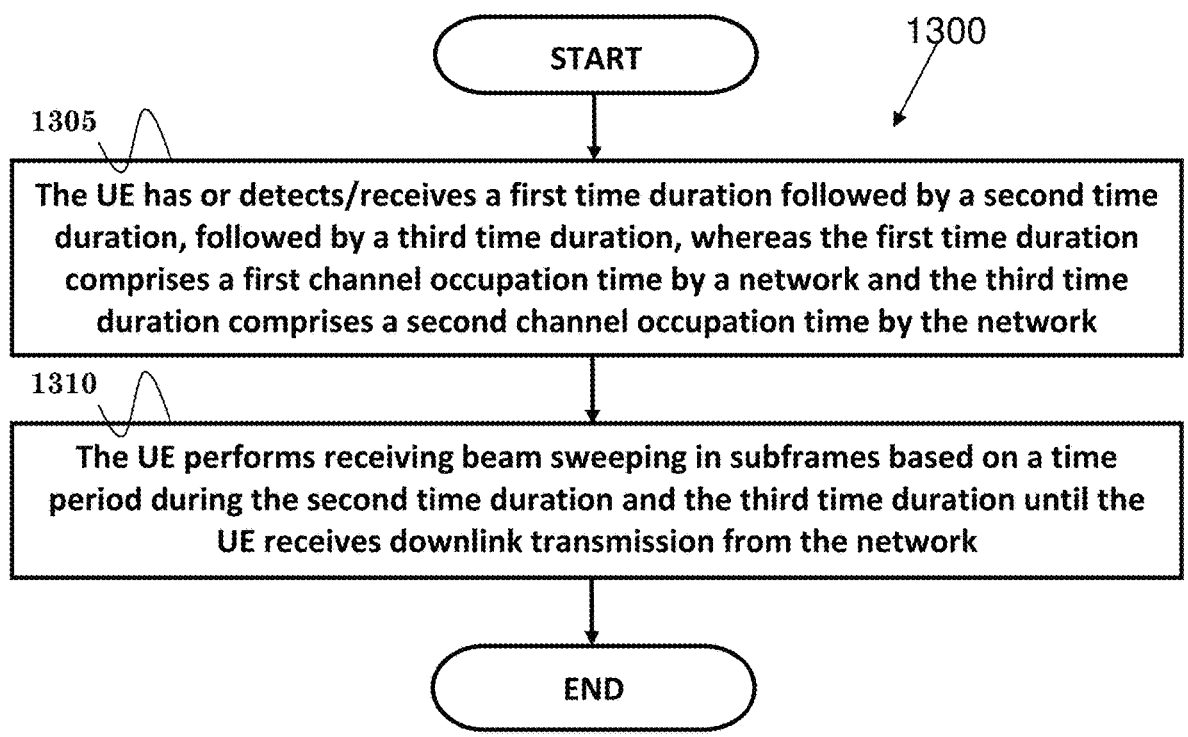
FIG. 13 is a flow chart according to one exemplary embodiment.

FIG. 13 is a flow chart 1300 according to one exemplary embodiment of a UE. In step 1305, the UE has or detects/receives a first time duration followed by a second time duration, followed by a third time duration, whereas the first time duration comprises a first channel occupation time by a network and the third time duration comprises a second channel occupation time by the network. In step 1310, the UE performs receiving beam sweeping in subframes based on a time period during the second time duration and the third time duration until the UE receives downlink transmission from the network.

Referring back to FIGS. 3 and 4, in one exemplary embodiment of a UE, the device 300 includes a program code 312 stored in the memory 310. The CPU 308 could execute program code 312 to enable the UE (i) to have or detect/receive a first time duration followed by a second time duration, followed by a third time duration, whereas the first time duration comprises a first channel occupation time by a network and the third time duration comprises a second channel occupation time by the network, and (ii) to perform receiving beam sweeping in subframes based on a time period during the second time duration and the third time duration until the UE receives downlink transmission from the network. Furthermore, the CPU 308 can execute the program code 312 to perform all of the above-described actions and steps or others described herein.

Figure 14:
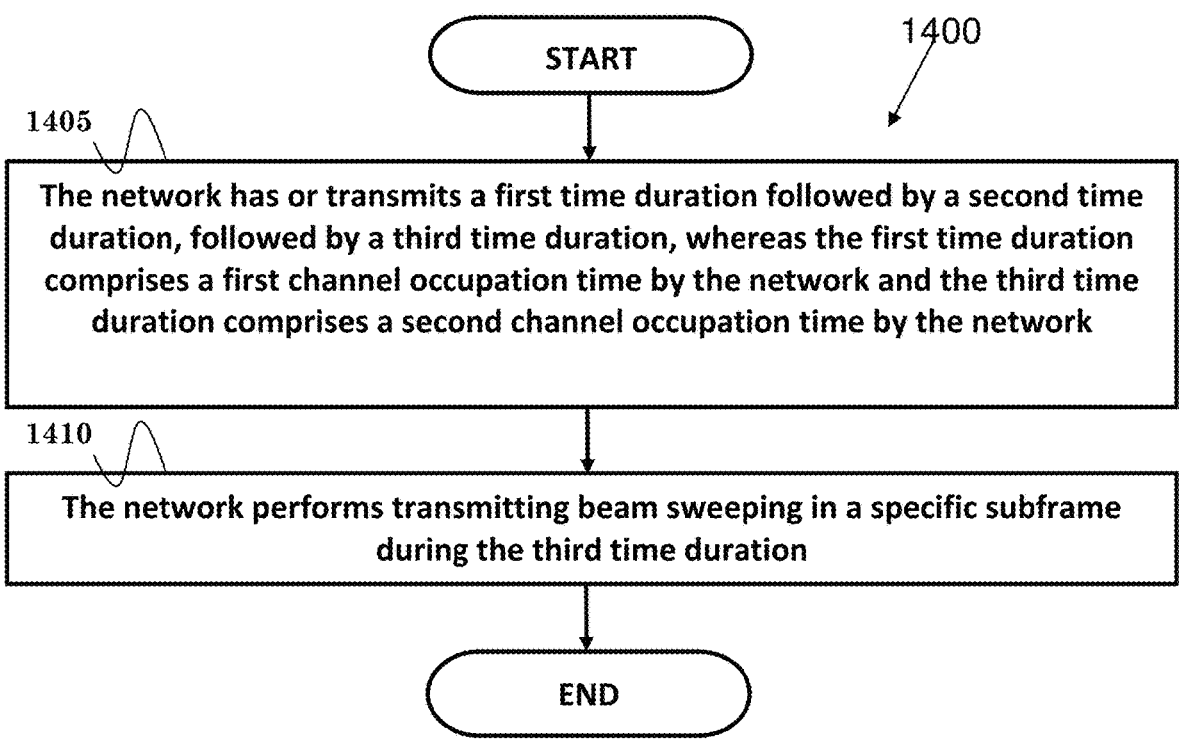
FIG. 14 is a flow chart according to one exemplary embodiment.

FIG. 14 is a flow chart 1400 according to one exemplary embodiment of a network. In step 1405, the network has or transmits a first time duration followed by a second time duration, followed by a third time duration, whereas the first time duration comprises a first channel occupation time by the network and the third time duration comprises a second channel occupation time by the network. In step 1410, the network performs transmitting beam sweeping in a specific subframe during the third time duration.

Referring back to FIGS. 3 and 4, in one exemplary embodiment of a network, the device 300 includes a program code 312 stored in the memory 310. The CPU 308 could execute program code 312 to enable the network (i) to have or transmit a first time duration followed by a second time duration, followed by a third time duration, whereas the first time duration comprises a first channel occupation time by the network and the third time duration comprises a second channel occupation time by the network, and (ii) to perform transmitting beam sweeping in a specific subframe during the third time duration. Furthermore, the CPU 308 can execute the program code 312 to perform all of the above-described actions and steps or others described herein.

In the context of the embodiments shown in FIGS. 13 and 14 and described above, the UE could perform receiving beam sweeping in subframes based on the time period during the second time duration and the third time duration until the UE finds a candidate beam. Alternatively, the UE could perform receiving beam sweeping in time units based on the time period during the second time duration and the third time duration until the UE receives downlink transmission from network. The UE could also perform receiving beam sweeping in time units based on the time period during the second time duration and the third time duration until the UE finds a candidate beam.

In one embodiment, the time period could be decided by a specific rule or a mapping table. The specific rule could be related to maximum or average occupation time value under the used LBT priority value. Furthermore, the time period could be derived by UE or indicated by network.

In one embodiment, the operating bands of the UE and the network could be located in unlicensed spectrum. Furthermore, the UE could perform the receiving beam sweeping by one or multiple beams at each sweep.

In one embodiment, the network could implement a transmitting beam sweeping with beams occupying the channel in a specific subframe in the third time duration. The network could also implement a transmitting beam sweeping with one beam or multiple beams at each sweep in a specific subframe in the third time duration. The specific subframe could be the subframe whereas the UE first implements transmitting beam sweeping in the third time duration.

In one embodiment, the UE could find a candidate beam from the receiving beam sweeping in the specific subframe. Furthermore, the UE could indicate the candidate beam to network during the third time duration.

In one embodiment, the network could schedule downlink transmission by using the beam pair, used in the last transmission or the first channel occupation time, with UEs in subframes other than the specific subframe during the third time duration, unless beam pair updated.

In one embodiment, the UE could detect or monitor downlink transmission from network by using the beam pair, used in the last reception or the first channel occupation time, in subframes whereas the receiving beam sweeping is not performed during the second time duration and the third time duration, unless beam pair updated. If the UE detects or monitors downlink transmission from network by using the beam pair, used in the last reception or the first channel occupation time, in subframes whereas the receiving beam sweeping is not performed during the second time duration and the third time duration, the UE could skip the receiving beam sweeping based the time period in the remaining subframes in the third time duration.

Figure 15:
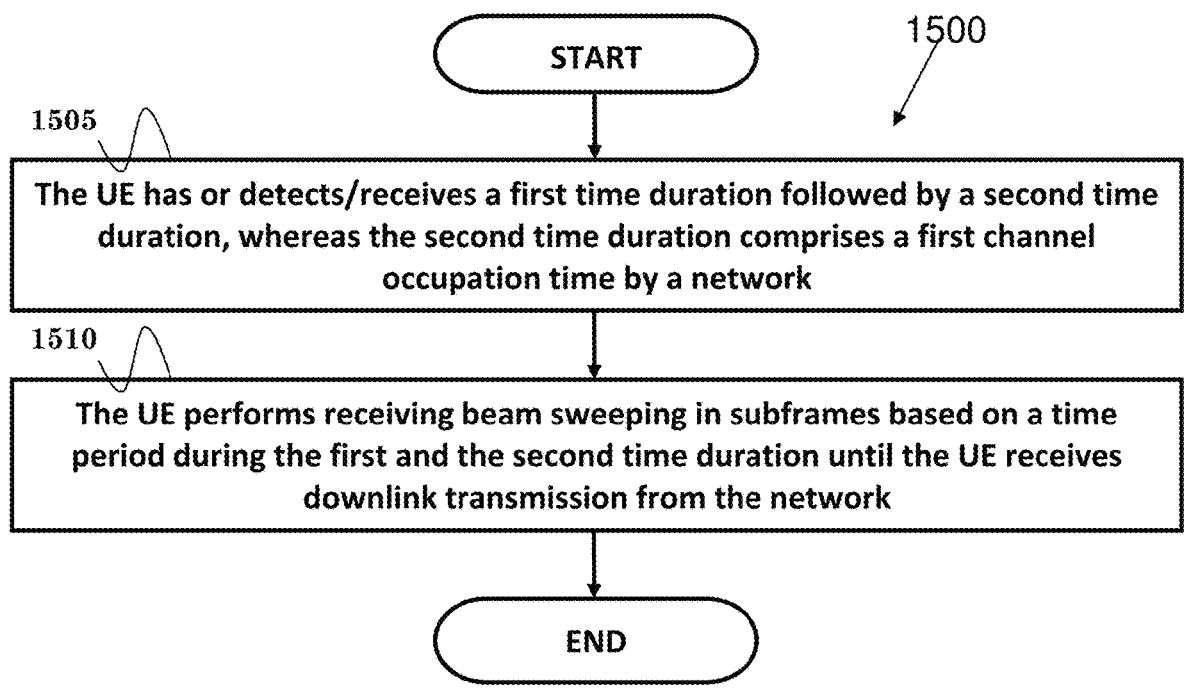
FIG. 15 is a flow chart according to one exemplary embodiment.

FIG. 15 is a flow chart 1500 according to one exemplary embodiment of a UE. In step 1505, the UE has or detects/receives a first time duration followed by a second time duration, whereas the second time duration comprises a first channel occupation time by a network. In step 1510, the UE performs receiving beam sweeping in subframes based on a time period during the first and the second time duration until the UE receives downlink transmission from the network.

Referring back to FIGS. 3 and 4, in one exemplary embodiment of a UE, the device 300 includes a program code 312 stored in the memory 310. The CPU 308 could execute program code 312 to enable the UE (i) to have or detect/receive a first time duration followed by a second time duration, whereas the second time duration comprises a first channel occupation time by a network, and (ii) to perform receiving beam sweeping in subframes based on a time period during the first and the second time duration until the UE receives downlink transmission from the network. Furthermore, the CPU 308 can execute the program code 312 to perform all of the above-described actions and steps or others described herein.

Figure 16:
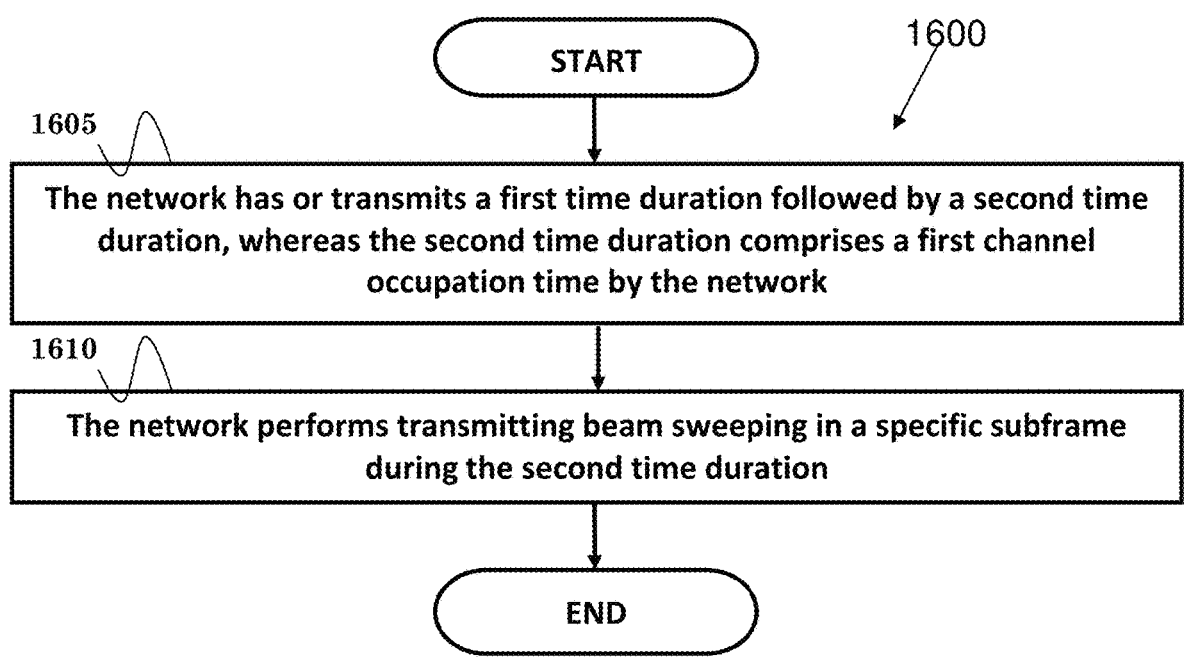
FIG. 16 is a flow chart according to one exemplary embodiment.

FIG. 16 is a flow chart 1600 according to one exemplary embodiment of a network. In step 1605, the network has or transmits a first time duration followed by a second time duration, whereas the second time duration comprises a first channel occupation time by the network. In step 1610, the network performs transmitting beam sweeping in a specific subframe during the second time duration.

Referring back to FIGS. 3 and 4, in one exemplary embodiment of a network, the device 300 includes a program code 312 stored in the memory 310. The CPU 308 could execute program code 312 to enable the network (i) to have or transmit a first time duration followed by a second time duration, whereas the second time duration comprises a first channel occupation time by the network, and (ii) to perform transmitting beam sweeping in a specific subframe during the second time duration. Furthermore, the CPU 308 can execute the program code 312 to perform all of the above-described actions and steps or others described herein.

In the context of the embodiments shown in FIGS. 15 and 16 and described above, the UE could perform receiving beam sweeping in subframes based on the time period during the first time duration and the second time duration until the UE finds a candidate beam. Alternatively, the UE could perform receiving beam sweeping in time units based on the time period during the first time duration and the second time duration until the UE receives downlink transmission from the network. The UE could also perform receiving beam sweeping in time units based on the time period during the first time duration and the second time duration until the UE finds a candidate beam.

In one embodiment, the time period could be decided by a specific rule or a mapping table. The specific rule could be related to maximum or average occupation time value under the used LBT priority value. Furthermore, the time period could be derived by UE or indicated by network.

In one embodiment, the operating bands of the UE and the network could be located in unlicensed spectrum. Furthermore, the UE could perform the receiving beam sweeping by one or multiple beams at each sweep.

In one embodiment, the network could implement a transmitting beam sweeping with beams occupying the channel in a specific subframe in the second time duration. The network could also implement a transmitting beam sweeping with one beam or multiple beams at each sweep in a specific subframe in the second time duration. The specific subframe could be the subframe whereas the UE first implements transmitting beam sweeping in the second time duration.

In one embodiment, the UE could find a candidate beam from the receiving beam sweeping in the specific subframe. Furthermore, the UE could indicate the candidate beam to network during the second time duration.

In one embodiment, the network could schedule downlink transmission by using the beam pair, used in the last transmission or the first channel occupation time, with UEs in subframes other than the specific subframe during the second time duration, unless beam pair updated. The UE could detect or monitor downlink transmission from network by using the beam pair, used in the last reception or the first channel occupation time, in subframes whereas the receiving beam sweeping is not performed during the first time duration and the second time duration, unless beam pair updated. If the UE detects or monitors downlink transmission from network by using the beam pair, used in the last reception or the first channel occupation time, in subframes whereas the receiving beam sweeping is not performed during the first time duration and the second time duration, the UE could skip the receiving beam sweeping based the time period in the remaining subframes in the second time duration.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
the UE at least one of detects or receives a downlink transmission in a first channel occupancy time of a network node in an unlicensed spectrum;
the UE determines an end of the first channel occupancy time; and
after the end of the first channel occupancy time determined by the UE, the UE for which the first channel occupancy time ended performs receiving beam sweeping in each subframe or each slot, based on a time period determined based on at least one of a rule, a mapping table, a maximum occupation time value, an average occupation time value, a derivation of the UE or an indication from the network node, until the UE at least one of detects or receives a downlink transmission in a second channel occupancy time of the network node, wherein the second channel occupancy time is a next channel occupancy time detected by the UE after the first channel occupancy time, wherein if the UE at least one of detects or receives the downlink transmission in the second channel occupancy time, the UE skips the receiving beam sweeping based on the time period in remaining time units in the second channel occupancy time.

2. The method of claim 1, wherein if the UE has not received a downlink transmission in the unlicensed spectrum, the UE performs receiving beam sweeping in each time unit until the UE receives a downlink transmission or until the UE finds a candidate beam.

3. The method of claim 1, wherein after the first channel occupancy time ends, the UE performs the receiving beam sweeping until the UE finds a candidate beam in the second channel occupancy time.

4. The method of claim 3, wherein after the UE finds the candidate beam, the UE indicates the candidate beam to the network node.

5. The method of claim 1, wherein the UE performs the receiving beam sweeping between an end of the first channel occupancy time and a timing when the UE receives the downlink transmission in the second channel occupancy time.

6. The method of claim 1, wherein the UE performs the receiving beam sweeping during a time duration during which no downlink transmission in the second channel occupancy time is detected by the UE, wherein the time duration starts when or after the first channel occupancy time ends.

7. The method of claim 1,
wherein the UE at least one of detects or receives the downlink transmission in the second channel occupancy time, via one or more beam pairs used in the first channel occupancy time.

8. The method of claim 1, wherein the UE at least one of detects or receives the downlink transmission in the second channel occupancy time, via one or more updated beam pairs different than one or more beam pairs used in the first channel occupancy time.

9. A method of a UE (User Equipment), comprising:
the UE at least one of detects or receives a downlink transmission in a first channel occupancy time of a network node in an unlicensed spectrum;
the UE determines an end of the first channel occupancy time; and
after the end of the first channel occupancy time determined by the UE, the UE for which the first channel occupancy time ended performs receiving beam sweeping in one or more subframes or slots between the end of the first channel occupancy time and a timing when the UE receives a downlink transmission in a second channel occupancy time of the network node, wherein the second channel occupancy time is a next channel occupancy time detected by the UE after the first channel occupancy time, and wherein the one or more subframes or slots in which the UE performs the receiving beam sweeping is determined based on a time period determined based on at least one of a rule, a mapping table, a maximum occupation time value, an average occupation time value, a derivation of the UE or an indication from the network node, wherein if the UE at least one of detects or receives the downlink transmission in the second channel occupancy time, the UE skips the receiving beam sweeping based on the time period in remaining time units in the second channel occupancy time.

10. The method of claim 9, wherein if the UE has not received a downlink transmission in the unlicensed spectrum, the UE performs receiving beam sweeping in the one or more subframes or slots based on the time period until the UE receives a downlink transmission or until the UE finds a candidate beam.

11. The method of claim 9, wherein after the end of the first channel occupancy time and before the end of the second channel occupancy time, the UE at least one of detects or monitors downlink transmission via a receiving beam which is used in a last reception or in the first channel occupancy time, unless the receiving beam is updated, wherein the UE at least one of detects or monitors downlink transmission in subframes or slots other than the one or more subframes or slots for performing beam receiving.

12. The method of claim 9, wherein after the first channel occupancy time ends, the UE performs the receiving beam sweeping based on the time period until the UE finds a candidate beam in the second channel occupancy time.

13. The method of claim 12, wherein after the UE finds the candidate beam, the UE indicates the candidate beam to the network node.

14. The method of claim 9, wherein the UE performs the receiving beam sweeping during a time duration during which no downlink transmission in the second channel occupancy time is detected by the UE, wherein the time duration starts when or after the first channel occupancy time ends.

15. The method of claim 9, wherein between the end of the first channel occupancy time and the timing when the UE receives the downlink transmission in the second channel occupancy time, the UE does not perform the receiving beam sweeping in any additional subframes or slots other than the one or more subframes or slots.

16. The method of claim 9, wherein the one or more subframes or slots is determined based on the time period and an ending subframe or slot of the first channel occupancy time.

17. The method of claim 9,
wherein the UE at least one of detects or receives the downlink transmission in the second channel occupancy time, via one or more beam pairs used in the first channel occupancy time.

18. The method of claim 9, wherein the UE at least one of detects or receives the downlink transmission in the second channel occupancy time, via one or more updated beam pairs different than one or more beam pairs used in the first channel occupancy time.

19. A method of a network node, comprising:
the network node transmits downlink transmission in a first channel occupancy time in an unlicensed spectrum;
the network node determines an end of the first channel occupancy time; and
after the end of the first channel occupancy time:
the network node transmits downlink transmission in a second channel occupancy time in the unlicensed spectrum, wherein the second channel occupancy time is a channel occupancy time subsequent to the first channel occupancy time; and
the network node performs transmitting beam sweeping in a specific subframe or slot of the second channel occupancy time based on a time period determined based on at least one of a rule, a mapping table, a maximum occupation time value, an average occupation time value, a derivation of a UE (User Equipment) or an indication from the network node, wherein if the downlink transmission is at least one of detected or received in the second channel occupancy time, receiving the beam sweeping is skipped based on the time period in remaining time units in the second channel occupancy time.

20. The method of claim 19, wherein the network node performs the transmitting beam sweeping with beams occupying a channel in the specific subframe or slot of the second channel occupancy time.

21. The method of claim 19, wherein the specific subframe or slot is starting subframe or slot of the second channel occupancy time.

22. The method of claim 19, wherein at least one of:
   the time period is indicated or configured by the network node for a UE (User Equipment) to perform receiving beam sweeping after the first channel occupancy time; or
   the specific subframe of slot is not determined as starting subframe or slot of the second channel occupancy time.

23. The method of claim 22, wherein the specific subframe or slot of the second channel occupancy time is a subframe or slot determined based on the time period and last subframe or slot in the first channel occupancy time.

24. The method of claim 19, wherein the network node transmits downlink transmission to the UE via a transmitting beam, used to serve the UE in a last transmission or in the first channel occupancy time, in subframes or slots other than the specific subframe or slot, unless the transmitting beam is updated.

* * * * *